(12) United States Patent
Jo et al.

(10) Patent No.: US 12,228,699 B2
(45) Date of Patent: Feb. 18, 2025

(54) OPTICAL IMAGING SYSTEM

(71) Applicant: Samsung Electro-Mechanics Co., Ltd., Suwon-si (KR)

(72) Inventors: Yong Joo Jo, Suwon-si (KR); Jae Hyuk Huh, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 781 days.

(21) Appl. No.: 17/239,793

(22) Filed: Apr. 26, 2021

(65) Prior Publication Data

US 2022/0155563 A1 May 19, 2022

(30) Foreign Application Priority Data

Nov. 13, 2020 (KR) .................. 10-2020-0152160

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC ............. G02B 13/0045; G02B 13/02; G02B 13/0015; G02B 13/0065; G02B 13/18; G02B 13/0005; G02B 9/60; G02B 3/0087; G02B 30/00; G02B 13/004; G02B 9/34–58; G02B 3/04
(Continued)

(56) References Cited

U.S. PATENT DOCUMENTS

| 4,324,458 A * | 4/1982 | Sato .................. G02B 13/02 359/764 |
| 10,215,962 B2 | 2/2019 | Liu et al. |

(Continued)

FOREIGN PATENT DOCUMENTS

| CN | 107015344 A | 8/2017 |
| CN | 108345087 A | 7/2018 |

(Continued)

OTHER PUBLICATIONS

Chinese Office Action Issued on Nov. 23, 2022, in counterpart Chinese Patent Application No. 202210423743.4 (6 pages in English, 7 pages in Chinese).

(Continued)

*Primary Examiner* — Cara E Rakowski
*Assistant Examiner* — Jennifer A Jones
(74) *Attorney, Agent, or Firm* — NSIP Law

(57) ABSTRACT

An optical imaging system includes a first lens, a second lens, a third lens, a fourth lens, and a fifth lens sequentially disposed in ascending numerical order along an optical axis of the optical imaging system from an object side of the optical imaging system toward an imaging plane of the optical imaging system, wherein LfS2el/L1S1el≤0.65 and 0.05<T1/TTL<0.1 are satisfied, where LfS2el is a maximum effective radius of an image-side surface of the fifth lens, L1S1el is a maximum effective radius of an object-side surface of the first lens, T1 is a thickness of the first lens along the optical axis, and TTL is a distance along the optical axis from the object-side surface of the first lens to the imaging plane.

18 Claims, 9 Drawing Sheets

(58) Field of Classification Search
USPC .............. 359/714, 715, 764, 763, 766, 771
See application file for complete search history.

(56) References Cited

U.S. PATENT DOCUMENTS

| | | | |
|---|---|---|---|
| 10,288,845 B2 | 5/2019 | Chen et al. | |
| 10,306,031 B2 | 5/2019 | Tseng et al. | |
| 10,386,605 B2* | 8/2019 | Chen | G02B 13/0065 |
| 10,585,263 B2 | 3/2020 | Nakamura | |
| 10,705,322 B2 | 7/2020 | Jia et al. | |
| 2016/0025242 A1 | 1/2016 | Benthien et al. | |
| 2017/0003476 A1* | 1/2017 | Liu | G02B 13/004 |
| 2017/0097498 A1 | 4/2017 | Amanai | |
| 2017/0205606 A1* | 7/2017 | Chen | G02B 5/208 |
| 2017/0212336 A1* | 7/2017 | Ko | G02B 15/12 |
| 2017/0307858 A1 | 10/2017 | Chen | |
| 2018/0031807 A1 | 2/2018 | Chen et al. | |
| 2018/0210177 A1* | 7/2018 | Liu | G02B 13/0045 |
| 2018/0275371 A1 | 9/2018 | Jhang et al. | |
| 2018/0364455 A1* | 12/2018 | Chen | G02B 13/0045 |
| 2019/0056570 A1 | 2/2019 | Yeh et al. | |
| 2019/0094492 A1 | 3/2019 | Nakamura | |
| 2019/0146186 A1 | 5/2019 | Liao et al. | |
| 2019/0162938 A1 | 5/2019 | Kwon | |
| 2019/0271832 A1* | 9/2019 | Kuo | G02B 13/0045 |
| 2019/0285842 A1 | 9/2019 | Chang et al. | |
| 2019/0324232 A1 | 10/2019 | Yang et al. | |
| 2019/0377158 A1 | 12/2019 | Liao et al. | |
| 2019/0384038 A1 | 12/2019 | Liao et al. | |
| 2020/0049948 A1 | 2/2020 | Kuo | |
| 2020/0073076 A1 | 3/2020 | Hsieh | |
| 2020/0088972 A1* | 3/2020 | Yoo | G02B 13/004 |
| 2020/0096745 A1* | 3/2020 | Chang | G03B 5/04 |
| 2020/0103617 A1 | 4/2020 | Fukaya | |
| 2020/0225450 A1* | 7/2020 | He | G02B 13/0045 |
| 2020/0241242 A1 | 7/2020 | Teraoka | |
| 2020/0249441 A1 | 8/2020 | Xu et al. | |
| 2020/0348492 A1 | 11/2020 | Huh et al. | |
| 2021/0033822 A1* | 2/2021 | Li | G02B 13/04 |
| 2021/0048630 A1* | 2/2021 | Liao | G02B 13/0045 |
| 2022/0003973 A1 | 1/2022 | Asami et al. | |
| 2022/0026686 A1* | 1/2022 | Wang | G02B 13/0045 |
| 2022/0035130 A1 | 2/2022 | Jhang et al. | |

FOREIGN PATENT DOCUMENTS

| | | |
|---|---|---|
| CN | 109073863 A | 12/2018 |
| CN | 110161659 A | 8/2019 |
| CN | 110262016 A | 9/2019 |
| CN | 111025538 A | 4/2020 |
| CN | 111880284 A | 11/2020 |
| DE | 10 2014 214 281 A1 | 1/2016 |
| JP | 2019-28201 A | 2/2019 |
| JP | 2020-122831 A | 8/2020 |
| JP | 2020-154045 A | 9/2020 |
| TW | 201802518 A | 1/2018 |
| TW | 201804209 A | 2/2018 |
| TW | 201805679 A | 2/2018 |
| TW | 201827880 A | 8/2018 |
| TW | 201905531 A | 2/2019 |
| TW | 201910845 A | 3/2019 |
| TW | 201918741 A | 5/2019 |
| TW | 201923407 A | 6/2019 |
| TW | 201932899 A | 8/2019 |
| TW | 201944115 A | 11/2019 |
| TW | 202001324 A | 1/2020 |
| TW | 202001330 A | 1/2020 |
| TW | I685675 B | 2/2020 |
| TW | 202009539 A | 3/2020 |
| TW | 202011069 A | 3/2020 |
| TW | 202024713 A | 7/2020 |
| TW | 202030516 A | 8/2020 |
| TW | 1727875 B | 5/2021 |

OTHER PUBLICATIONS

Taiwanese Office Action issued Nov. 24, 2021, in counterpart Taiwanese Patent Application No. 110115552 (15 pages in English, 16 pages in Mandarin).

Chinese Office Action issued on Aug. 24, 2022, in counterpart Chinese Patent Application No. 202110869321.5 (8 pages in English, 8 pages in Chinese).

Taiwanese Office Action issued on Nov. 2, 2022, in counterpart Taiwanese Patent Application No. 111127957 (8 pages in English, 10 pages in Chinese).

Korean Office Action issued on Aug. 10, 2022, in counterpart Korean Patent Application No. 10-2020-0152160 (15 pages in English, 11 pages in Korean).

Taiwanese Office Action Issued on Mar. 26, 2024, in Counterpart Taiwanese Patent Application No. 112120561 (5 Pages in English, 6 Pages in Chinese).

Taiwanese Office Action issued on Sep. 30, 2024, in counterpart Taiwanese Patent Application No. 113135288 (11 pages in English, 12 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2020-0152160 filed on Nov. 13, 2020, in the Korean Intellectual Property Office, the entire disclosure of which is incorporated herein by reference for all purposes.

BACKGROUND

1. Field

This application discloses an optical imaging system.

2. Description of Related Art

A camera module has become a standard feature of a mobile electronic device such as a smartphone. Furthermore, the thickness of such a mobile electronic device has been decreasing, and accordingly it has been necessary to decrease the thickness of the camera module mounted in the mobile electronic.

A telephoto camera module has been adopted for use in a mobile electronic device to obtain a zoom effect of capturing an image of a subject at a narrow field of view.

However, when a plurality of lenses of a camera module are arranged in a thickness direction of the mobile electronic device, the thickness of the mobile electronic device increases as the number of lenses increases, which is contrary to the trend of decreasing the thickness of the mobile electronic device.

In particular, the telephoto camera module has a relatively long focal length, and accordingly it is difficult to use the telephoto camera module in a mobile electronic device having a small thickness.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens sequentially disposed in ascending numerical order along an optical axis of the optical imaging system from an object side of the optical imaging system toward an imaging plane of the optical imaging system, wherein LfS2el/L1S1el≤0.65 and 0.05<T1/TTL<0.1 are satisfied, where LfS2el is a maximum effective radius of an image-side surface of the fifth lens, L1S1el is a maximum effective radius of an object-side surface of the first lens, T1 is a thickness of the first lens along the optical axis, and TTL is a distance along the optical axis from the object-side surface of the first lens to the imaging plane.

L3S1el/L1S1el≤0.85 may be satisfied, where L3S1el is a maximum effective radius of an object-side surface of the third lens.

L1_Lf>4.9 mm may be satisfied, where L1_Lf is a distance along the optical axis from an image-side surface of the first lens to an object-side surface of the fifth lens.

n2+n3>3.2 may be satisfied, where n2 is a refractive index of the second lens, and n3 is a refractive index of the third lens.

|f/f1+f/f2|<1.2 may be satisfied, where f1 is a focal length of the first lens, f2 is a focal length of the second lens, and f is an overall focal length of the optical imaging system.

0≤d12/f≤0.05 may be satisfied, where d12 is a distance along the optical axis from an image-side surface of the first lens to an object-side surface of the second lens, and f is an overall focal length of the optical imaging system.

R1/f≤0.3 may be satisfied, where R1 is a radius of curvature of the object-side surface of the first lens, and f is an overall focal length of the optical imaging system.

0.8≤TTL/f≤0.95 may be satisfied, where f is an overall focal length of the optical imaging system.

FOV<12° may be satisfied, where FOV is a field of view of the optical imaging system.

4<TTL/(2*IMG HT)<4.9 may be satisfied, where IMG HT is one half of a diagonal length of the imaging plane.

Fno≥4.0 may be satisfied, where Fno is an F-number of the optical imaging system.

The first lens may have a positive refractive power, and the second lens may have a negative refractive power.

The third lens may have a positive refractive power, the fourth lens may have a negative refractive power, and the fifth lens may have a positive refractive power.

The optical imaging system may further include a reflecting member disposed in front of the first lens, wherein the reflecting member includes a reflecting surface configured to reflect light incident on the reflecting surface toward the first lens.

In another general aspect, an optical imaging system includes a first lens, a second lens, a third lens, and a fourth lens sequentially disposed in ascending numerical order along an optical axis of the optical imaging system from an object side of the optical imaging system toward an imaging plane of the optical imaging system, wherein L3S1el/L1S1el≤0.85 and 0.05<T1/TTL<0.1 are satisfied, where L3S1el is a maximum effective radius of an object-side surface of the third lens, L1S1el is a maximum effective radius of an object-side surface of the first lens, T1 is a thickness of the first lens along the optical axis, and TTL is a distance along the optical axis from the object-side surface of the first lens to the imaging plane.

LfS2el/L1S1el≤0.65 may be satisfied, where LfS2el is a maximum effective radius of an image-side surface of the fourth lens.

In another general aspect, an optical imaging system includes a plurality of lenses sequentially disposed along an optical axis of the optical imaging system from an object side of the optical imaging system toward an imaging plane of the optical imaging system, wherein LfS2el/L1S1el≤0.65 and 0.05<T1/TTL<0.1 are satisfied, where LfS2el is a maximum effective radius of an image-side surface of a last lens that is closest to the imaging plane among the plurality of lenses, L1S1el is a maximum effective radius of an object-side surface of a first lens that is closest to the object side of the optical imaging system among the plurality of lenses, T1 is a thickness of the first lens along the optical axis, and TTL is a distance along the optical axis from the object-side surface of the first lens to the imaging plane.

L3S1el/L1S1el≤0.85 may be satisfied, where L3S1el is a maximum effective radius of an object-side surface of a third lens that is third closest to the object side of the optical imaging system among the plurality of lenses.

0.4<BFL/f<0.7 may be satisfied, where f is an overall focal length of the optical imaging system, and BFL is a distance along the optical axis from the image-side surface of the last lens to the imaging plane.

Each pair of adjacent lenses among the plurality of lenses may have refractive powers having opposite signs.

Other features and aspects will be apparent from the following detailed description, the drawings, and the claims.

DETAILED DESCRIPTION

Figure 1:
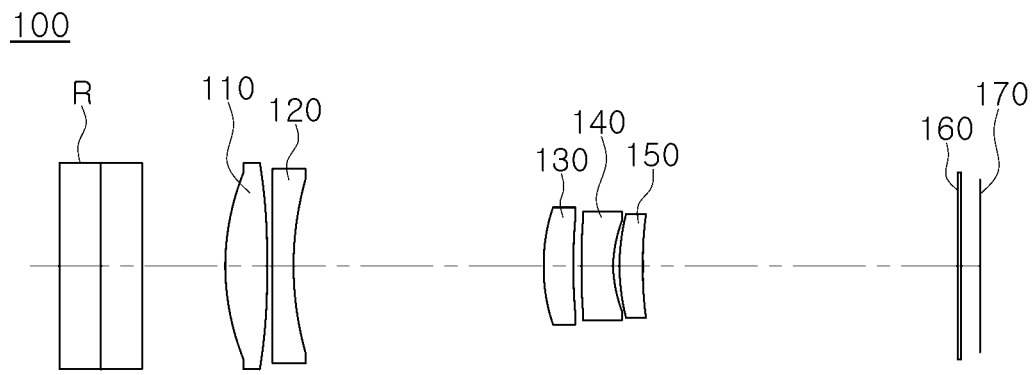
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur.

Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

In the drawings, thicknesses, sizes, and shapes of lenses have been slightly exaggerated for convenience of explanation. In particular, shapes of spherical surfaces or aspherical surfaces illustrated in the drawings are illustrated by way of example. That is, the shapes of the spherical surfaces or the aspherical surfaces are not limited to those illustrated in the drawings.

An optical imaging system may include a plurality of lenses disposed along an optical axis of the optical imaging system from an object side of the optical imaging system to an imaging plane of the optical imaging system. The plurality of lenses may be spaced apart from each other by preset distances along the optical axis. The plurality of lenses may include at least four lenses.

As an example, the optical imaging system may include four or more lenses.

An optical imaging system including four lenses or five lenses is disclosed in this application, but the number of lenses is not limited thereto. For example, the optical imaging system may include six or more lenses.

A first lens is a lens closest to the object side or a reflecting member of the optical imaging system, and a last lens is a lens closest to the imaging plane of the optical imaging system.

In each lens, a first surface or an object-side surface of the lens is a surface the lens closest to the object side of the optical imaging system, and a second surface or an image-side surface of the lens is a surface of the lens closest to the imaging plane of the optical imaging system.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations $\sin θ ≈ θ$, $\tan θ ≈ θ$, and $\cos θ ≈ 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

An optical imaging system may include at least four lenses.

For example, the optical imaging system may include a first lens, a second lens, a third lens, and a fourth lens sequentially disposed in ascending numerical along an optical axis of the optical imaging system from an object side of the optical imaging system toward an imaging plane of the optical imaging system.

However, the optical imaging system is not limited to only four lenses, but may further include a fifth lens disposed between the fourth lens and the imaging plane.

In addition, the optical imaging system may further include a reflecting member having a reflecting surface that changes a path of light. As an example, the reflecting member may be a mirror or a prism.

The reflecting member may be disposed closer to the object side of the optical imaging system than a plurality of lenses are. As an example, the reflecting member may be disposed in front of the first lens, that is, closer to the object side of the optical imaging system than the first lens. Therefore, a lens disposed closest to the object side of the optical imaging system may be a lens disposed closest to the reflection member.

In addition, the optical imaging system may further include an image sensor having an imaging surface disposed at the imaging plane of the optical imaging system. The image sensor converts an image of a subject formed on an effective imaging area of the imaging surface of the image sensor by the lenses of the optical imaging system into an electrical signal.

The optical imaging system may further include an infrared cut-off filter (hereinafter referred to as a filter) cutting off infrared rays in the light passing through the optical imaging system. The filter may be disposed between the lens disposed closest to the image sensor and the image sensor.

In the optical imaging system, all of the lenses may be made of a plastic material. Different lenses may be made of different plastic materials.

Figure 17:
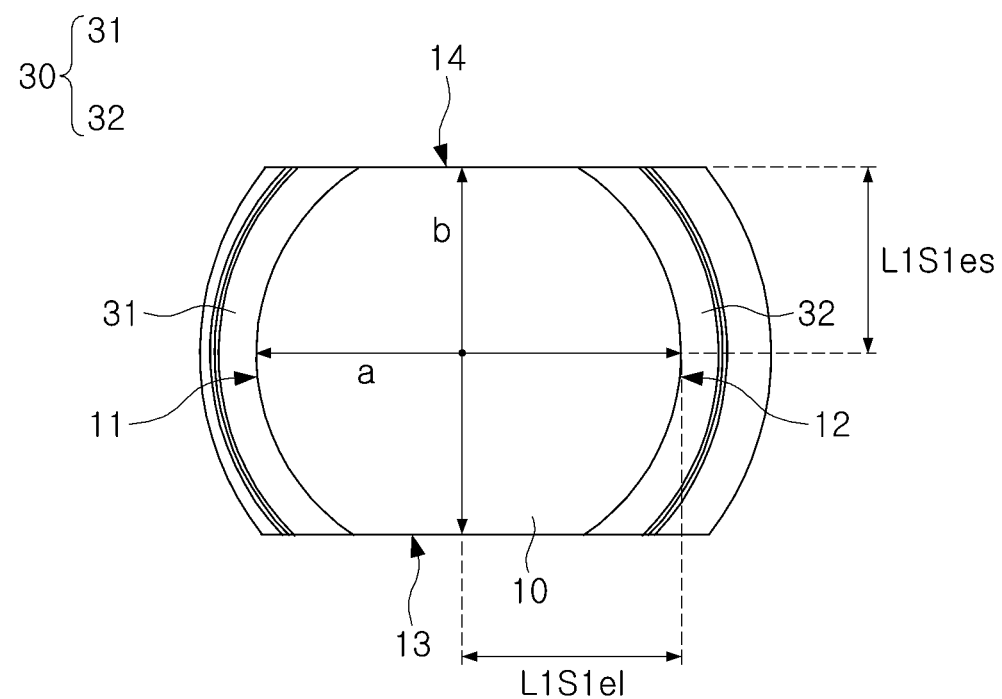
FIG. 17 is a plan view of an example of a lens having a non-circular shape of any of the optical imaging systems illustrated in FIGS. 1, 3, 5, 7, 9, 11, 13, and 15.

FIG. 17 is a plan view of an example of a lens having a non-circular shape of any of the optical imaging systems illustrated in FIGS. 1, 3, 5, 7, 9, 11, 13, and 15.

Referring to FIG. 17, at least some of the lenses of the optical imaging systems 100, 200, 300, 400, 500, 600, 700, and 800 illustrated in FIGS. 1, 3, 5, 7, 9, 11, 13, and 15 may have a non-circular shape when viewed in a direction of the optical axis of the lens or the optical imaging system. For example, a first lens and a last lens may have a non-circular shape. The other lenses may have a non-circular shape when viewed in the optical axis direction or a circular shape when viewed in the optical axis direction. In this application, a statement that a lens has a non-circular shape or a circular shape means that the lens has a non-circular shape or a circular state when viewed in the optical axis direction.

A lens having a non-circular shape may have four side surfaces. Two of the side surfaces may oppose each other, and the other two of the side surfaces may oppose each other. In addition, the side surfaces opposing each other may have the same shape.

For example, a lens having a non-circular shape may include a first side surface, a second side surface, a third side surface, and a fourth side surface. The first side surface and the second side surface may be located on opposite sides of the optical axis, and the third side surface and the fourth side surface may be located on opposite sides of the optical axis. The third side surface and the fourth side surface may each connect the first side surface and the second side surface to each other.

When viewed in an optical axis direction, the first side surface and the second side surface may have an arc shape, and the third side surface and the fourth side surface may have a substantially linear shape. A gate, which is a passage through which a resin material is injected into a mold to form the lens in an injection-molding operation, may be formed in the first side surface or the second side surface.

The third side surface and the fourth side surface may each connect the first side surface and the second side surface to each other. In addition, the third side surface and the fourth side surface may be symmetrical to each other about the optical axis, and may be parallel to each other.

The lens having a non-circular shape may have a first axis and a second axis intersecting the optical axis. For example, the first axis may be a shortest line connecting the first side surface and the second side surface to each other while passing through the optical axis, and the second axis may be a shortest line connecting the third side surface and the fourth side surface to each other while passing through the optical axis. The first axis and the second axis may be perpendicular to each other, and a length of the first axis may be greater than a length of the second axis.

All of the lenses of the optical imaging system may include an optical portion 10 and a flange portion 30.

The optical portion 10 may be a portion of the lens exhibiting a lens characteristic of the lens. As an example, light reflected from a subject may be refracted while passing through the optical portion 10.

The optical portion 10 may have a positive refractive power or a negative refractive power, and may have an aspherical shape.

In addition, the optical portion 10 may have an object-side surface (a surface facing an object side of the optical imaging system) and an image-side surface (a surface facing an imaging plane of the optical imaging system. For simplicity of explanation, the object-side surface of the optical portion 10 is illustrated in FIG. 17.

The flange portion 30 may be configured to mount lens on another component, for example, a lens barrel or another lens.

The flange portion 30 may extend from at least a portion of a circumference of the optical portion 10, and may be integrally formed with the optical portion 10.

In the lens having a non-circular shape, both the optical portion 10 and the flange portion 30 may have a non-circular shape. For example, the optical portion 10 and the flange portion 30 may both have a non-circular shape when viewed in the optical axis direction as illustrated in FIG. 17. Alternatively, the optical portion 10 may have a circular shape when viewed in the optical axis direction, and the flange portion 30 may have a non-circular shape when viewed in the optical axis direction.

The optical portion 10 may include a first edge 11, a second edge 12, a third edge 13, and a fourth edge 14. The first edge 11 and the second edge 12 may oppose each other, and the third edge 13 and the fourth edge 14 may oppose each other.

The third edge 13 and the fourth edge 14 may each connect the first edge 11 and the second edge 12 to each other.

The first edge 11 and the second edge 12 may be located on opposite sides of the optical axis, and the third edge 13 and the fourth edge 14 may be located on opposite sides of the optical axis.

When viewed in the optical axis direction, the first edge 11 and the second edge 12 may have an arc shape, and the third edge 13 and the fourth edge 14 may have a substantially linear shape. The third edge 13 and the fourth edge 14 may be symmetrical to each other about the optical axis (Z axis), and may be parallel to each other.

The shortest distance between the first edge 11 and the second edge 12 may be greater than the shortest distance between the third edge 13 and the fourth edge 14.

The optical portion 10 may have a major axis a and a minor axis b. As an example, when viewed in the optical axis direction, a shortest line connecting the third edge 13 and the fourth edge 14 to each other while passing through the optical axis may be the minor axis b, and a shortest line connecting the first edge 11 and the second edge 12 to each other while passing through the optical axis and perpendicular to the minor axis b may be the major axis a.

One half of the major axis a may be a maximum effective radius, and one half of the minor axis b may be a minimum effective radius.

Assuming that the lens illustrated in FIG. 17 is the first lens, a maximum effective radius of the object-side surface of the first lens may be denoted by reference numeral L1S1el in FIG. 17, and a minimum effective radius of the object-side surface of the foremost lens may be denoted by reference numeral L1S1es in FIG. 17.

The flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 a side surface of the optical portion 10 that is adjacent to the first flange portion 31, and the second edge 12 of the optical portion 10 a side surface of the optical portion 10 that is adjacent to the second flange portion 32.

The third edge 13 of the optical portion 10 is one side surface of the optical portion 10 on which the flange portion 30 is not formed, and the fourth edge 14 of the optical portion 10 is the other side surface of the optical portion 10 on which the flange portion 30 is not formed.

Effective radii of the first lens and the second lens may be greater than those of the other lenses of the optical imaging system.

An effective radius of a lens surface is a radius of a portion of the lens surface through which light actually passes, and is not necessarily a radius of an outer edge of the lens surface. Stated another way, an effective radius of a lens surface is a distance in a direction perpendicular to an optical axis of the lens surface between the optical axis and a marginal ray of light passing through the lens surface. The object-side surface of a lens and the image-side surface of the lens may have different effective radiuses.

An effective radius of a lens may be a radius of an optical portion of the lens. For example, the non-circular lens illustrated in FIG. 17 may have a maximum effective radius (one half of a shortest straight line connecting the first edge 11 and the second edge 12 to each other while passing through the optical axis) and a minimum effective radius (one half of a shortest straight line connecting the third edge 13 and the fourth edge 14 to each other while passing through the optical axis and perpendicular to the shortest straight line connecting the first edge 11 and the second edge 12 to each other).

In this application, the term "effective radius" refers to the maximum effective radius unless otherwise specified.

The plurality of lenses may have at least one aspherical surface. That is, at least one of the object-side surface and the image-side surface of at least one of the lenses may be aspherical. Each aspherical surface is defined by Equation 1 below.

$$Z = \frac{cY^2}{1+\sqrt{1-(1+K)c^2Y^2}} + AY^4 + BY^6 +$$
$$CY^8 + DY^{10} + EY^{12} + FY^{14} + GY^{16} + HY^{18} + JY^{20} \quad (1)$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A, B, C, D, E, F, G, H, and J are aspherical constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface An optical imaging system including first to fifth lenses may have positive-negative-positive-negative-positive refractive powers sequentially from an object side of the optical imaging system toward an imaging plane of the optical imaging system.

An optical imaging system including first to fourth lenses may have positive-negative-positive-negative refractive powers sequentially from an object side of the optical imaging system toward an imaging plane of the optical imaging system.

The optical imaging system may satisfy any one or any combination of any two or more of Conditional Expressions 1 to 13 below.

| | |
|---|---|
| n2+n3>3.2 | (Conditional Expression 1) |
| \|f/f1+f/f2\|<1.2 | (Conditional Expression 2) |
| 0≤d12/f≤0.05 | (Conditional Expression 3) |
| L3S1el/L1S1el≤0.85 | (Conditional Expression 4) |
| LfS2el/L1S1el≤0.65 | (Conditional Expression 5) |
| R1/f≤0.3 | (Conditional Expression 6) |
| L1_Lf>4.9 mm | (Conditional Expression 7) |
| 0.8≤TTL/f≤0.95 | (Conditional Expression 8) |
| 0.05<T1/TTL<0.1 | (Conditional Expression 9) |
| FOV<12° | (Conditional Expression 10) |
| 4<TTL/(2*IMG HT)<4.9 | (Conditional Expression 11) |
| 0.4<BFL/f<0.7 | (Conditional Expression 12) |
| Fno≥4.0 | (Conditional Expression 13) | n2 is a refractive index of the second lens, and n3 is a refractive index of the third lens.

f1 is a focal length of the first lens, f2 is a focal length of the second lens, and f is an overall focal length of the optical imaging system.

d12 is a distance along the optical axis from an image-side surface of the first lens to an object-side surface of the second lens, R1 is a radius of curvature of an object-side surface of the first lens, and T1 is a thickness of the first lens along the optical axis.

L1S1el is a maximum effective radius of the object-side surface of the first lens, L3S1el is a maximum effective radius of an object-side surface of the third lens, and LfS2el is a maximum effective radius of an image-side surface of the last lens, i.e., the fourth lens or the fifth lens.

TTL is a distance along the optical axis from the object-side surface of the first lens to an imaging plane of the image sensor, and BFL is a distance along the optical axis from the image-side surface of the last lens, i.e., the fourth lens or the fifth lens, to the imaging plane of the image sensor.

L1_Lf is a distance along the optical axis from the image-side surface of the first lens to an object-side surface of the last lens.

IMG HT is one half of a diagonal length of the imaging plane of the image sensor, and FOV is a field of view of the optical imaging system.

Fno is an F-number of the optical imaging system.

When n2+n3 is outside of the range of Conditional Expression 1, it may be difficult to implement the optical imaging system with a long overall focal length.

When |f/f1+f/f2| satisfies the range of Conditional Expression 2, chromatic aberration of the optical imaging system may be reduced while implementing the optical imaging system with a long overall focal length f.

When d12/f satisfies the range of Conditional Expression 3, chromatic aberration of the optical imaging system may be reduced.

When L3S1el/L1S1el satisfies the range of Conditional Expression 4 or LfS2el/L1S1el satisfies the range of Conditional Expression 5, the optical imaging system may be miniaturized.

When R1/f satisfies the range of Conditional Expression 6, the optical imaging system may be implemented with a long overall focal length f.

When L1_Lf satisfies the range of Conditional Expression 7, a size of the last lens may be reduced.

Radiuses of curvature of the surfaces of the lenses, thickness of the lenses and the other elements, distances between adjacent ones of the lenses and the other elements, the focal lengths of the lenses, the focal length of the optical imaging system, L1S1el, L3S1el, LfS2el, L1_Lf, TTL, BFL, and IMG HT are expressed in millimeters (mm), although other units of measurement may be used. FOV is expressed in degrees. Fno, refractive indices of the lenses, and Abbe numbers of the lenses are dimensionless quantities.

The thicknesses of the lenses and the other elements, the distances between the adjacent ones of the lenses and the other elements, L1_Lf, TTL, and BFL are measured along the optical axis of the optical imaging system.

The optical imaging system may be a telephoto lens having a relatively narrow field of view and a long focal length.

Figure 18:
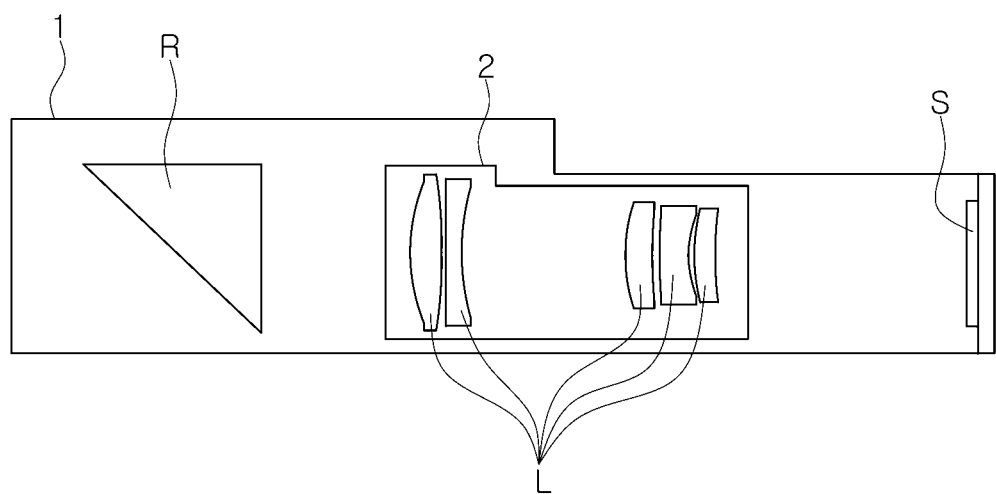
FIG. 18 is a schematic side cross-sectional view illustrating an example of a mobile electronic device including any of the optical imaging systems illustrated in FIGS. 1, 3, 5, 7, 9, 11, 13, and 15. Throughout the drawings and the detailed description, the same reference numerals refer to the same elements. The drawings may not be to scale, and the relative size, proportions, and depiction of elements in the drawings may be exaggerated for clarity, illustration, and convenience.

Referring to FIG. 18, a thickness of a mobile electronic device in which the optical imaging system is mounted may be reduced.

FIG. 18 is a schematic side cross-sectional view illustrating an example of a mobile electronic device in which the optical imaging system is mounted.

Referring to FIG. 18, a mobile electronic device 1 may include a camera module including a reflecting member R, a lens assembly 2, and an image sensor S.

The lens assembly may include a lens barrel and a plurality of lenses L. The plurality of lenses L may be the plurality of lenses included in any of the optical imaging systems illustrated in FIGS. 1, 3, 5, 7, 9, 11, 13, and 15.

Figure 15:
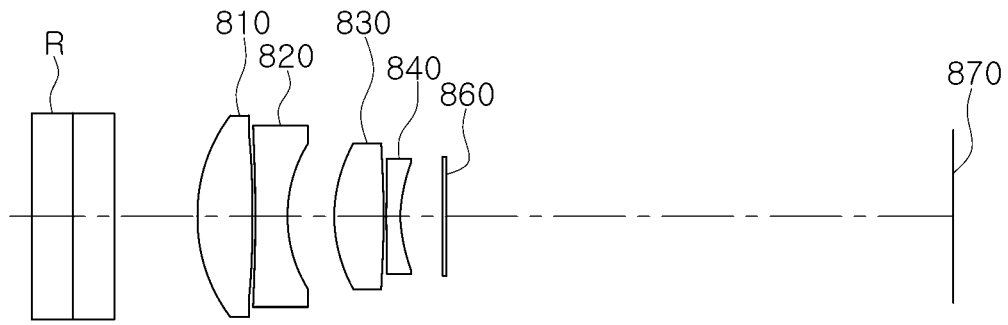
FIG. 15 is a view illustrating an eighth example of an optical imaging system.

A portion of the lens barrel may have a width in a thickness direction of the mobile electronic device 1 that is smaller than a thickness of a remaining portion of the lens barrel. A point at which the width of the lens barrel changes may be at any point between the second lens and the fifth lens if the plurality of lenses L are five lenses as illustrated in any of FIGS. 1, 3, 5, 7, 9, 11, and 13, or between the second lens and the fourth lens if the plurality of lenses L are four lenses as illustrated in FIG. 15.

As the performance of a camera module of the related art has been improved, there has been a problem that a portion of the camera module of the related art protrudes outwardly from a mobile electronic device including the camera module of the related art.

However, since a portion of the mobile electronic device 1 including any of the optical imaging systems illustrated in FIGS. 1, 3, 5, 7, 9, 11, 13, and 15 may have a smaller thickness than a remaining portion of the mobile electronic device 1 as illustrated in FIG. 18, an area of a portion of the camera module protruding outwardly from the mobile electronic device 1 may be reduced as illustrated in FIG. 18.

Figure 2:
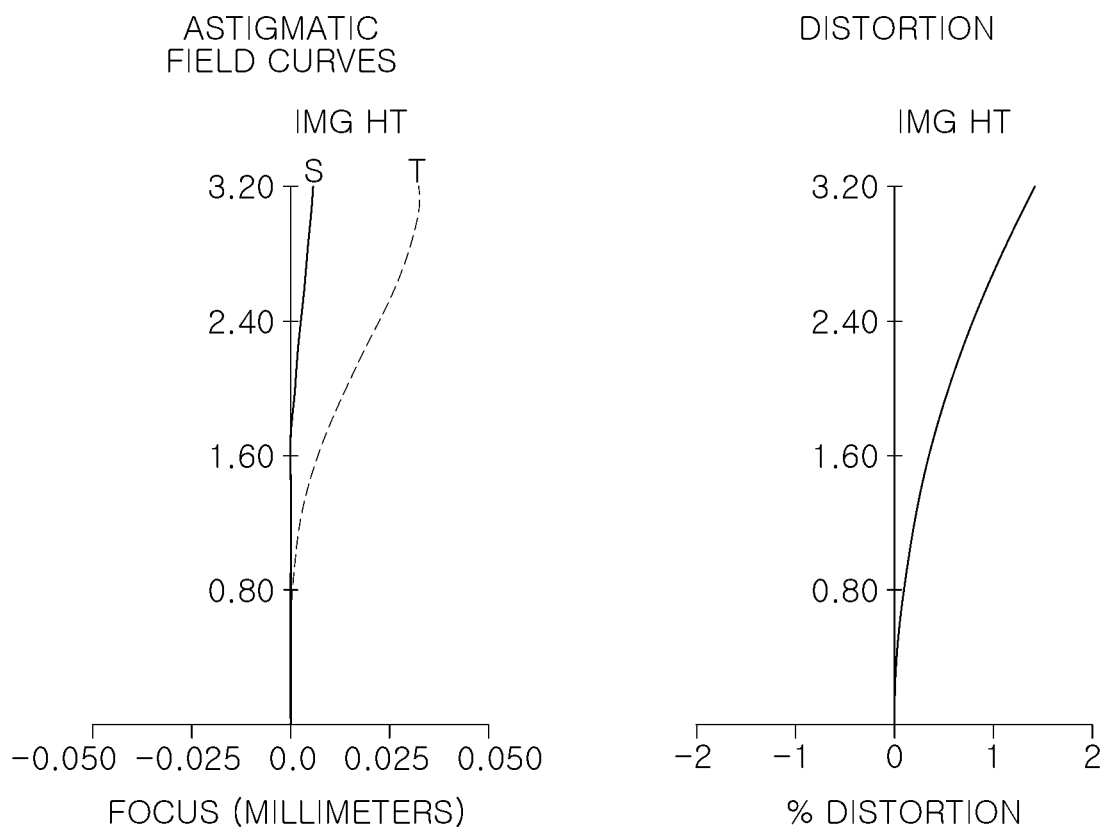
FIG. 2 is a view illustrating aberration characteristics of the optical imaging system illustrated in FIG. 1.

FIG. 1 is a view illustrating a first example of an optical imaging system, and FIG. 2 is a view illustrating aberration characteristics of the optical imaging system illustrated in FIG. 1.

Referring to FIG. 1, an optical imaging system 100 may include an optical system including a first lens 110, a second lens 120, a third lens 130, a fourth lens 140, and a fifth lens 150, and may further include a filter 160 and an image sensor 170.

In addition, the optical imaging system 100 may further include a reflecting member R disposed in front of the first lens 110 and having a reflecting surface that changes a path of light. The reflecting member R may be a prism, but alternatively may be a mirror.

Radii of curvature, thicknesses or distances, refractive indices, Abbe numbers, effective radii, and focal lengths of the lenses and other elements are listed in Table 1 below. The thickness or distance is a thickness when it defines a distance between two surfaces of a lens or other element, and is a distance when it defines a distance between a surface of one lens or other element and a surface of a next lens or other element. The effective radius listed in Table 1 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

An overall focal length f of the optical imaging system 100 may be 30.9 mm, an Fno thereof may be 4.35, an IMG HT thereof may be 3.201 mm, and an FOV thereof may be 11.65°.

The first lens 110 may have a positive refractive power, and a first surface and a second surface thereof may be convex.

The second lens 120 may have a negative refractive power, and a first surface thereof may be convex while a second surface thereof may be concave.

The third lens 130 may have a positive refractive power, and a first surface thereof may be convex while a second surface thereof may be concave.

The fourth lens 140 may have a negative refractive power, and a first surface thereof may be convex while a second surface thereof may be concave.

The fifth lens 150 may have a positive refractive power, and a first surface thereof may be convex while a second surface thereof may be concave.

The surfaces of the first to fifth lenses 110 to 150 may have the aspherical constants listed in Table 2 below. For example, both the object-side surface and the image-side surface of each of the first to fifth lenses 110 to 150 may be aspherical.

TABLE 1

| Surface No. | Element | Radius of Curvature | Thickness or Distance | Refractive Index | Abbe Number | Effective Radius | Focal Length |
|---|---|---|---|---|---|---|---|
| S1 |  | Infinity | 5.500 | 1.723 | 29.5 | 6.000 |  |
| S2 | Prism | Infinity | 5.500 | 1.723 | 29.5 | 8.485 |  |
| S3 |  | Infinity | 3.000 |  |  | 6.000 |  |
| S4 | First | 8.74 | 1.548 | 1.534 | 55.7 | 3.450 | 12.886 |
| S5 | Lens | −31.09 | 0.213 |  |  | 3.361 |  |
| S6 | Second | 140.84 | 0.800 | 1.615 | 26.0 | 3.248 | −19.749 |
| S7 | Lens | 11.25 | 9.350 |  |  | 3.049 |  |
| S8 | Third | 7.26 | 1.098 | 1.671 | 19.2 | 1.958 | 16.283 |
| S9 | Lens | 19.87 | 0.300 |  |  | 1.850 |  |
| S10 | Fourth | 32.05 | 1.181 | 1.615 | 26.0 | 1.817 | −8.336 |
| S11 | Lens | 4.39 | 0.249 |  |  | 1.688 |  |
| S12 | Fifth | 7.27 | 0.869 | 1.546 | 56.1 | 1.700 | 28.302 |
| S13 | Lens | 13.12 | 11.763 |  |  | 1.736 |  |
| S14 | Filter | Infinity | 0.110 | 1.519 | 64.2 | 3.104 |  |
| S15 |  | Infinity | 0.719 |  |  | 3.113 |  |
| S16 | Imaging Plane | Infinity |  |  |  | 3.201 |  |

TABLE 2

| Constant | S4 | S5 | S6 | S7 | S8 |
|---|---|---|---|---|---|
| K | −7.3713E−01 | −3.2661E+00 | −8.5696E+01 | 3.7327E−01 | 4.1164E−01 |
| A | 3.7293E−05 | 1.4393E−04 | −2.4483E−04 | −4.4303E−04 | −3.8384E−04 |
| B | −1.3205E−07 | −1.4905E−06 | 8.9417E−06 | 5.7595E−06 | 6.4450E−06 |
| C | −7.7546E−08 | −1.1906E−07 | 3.3652E−08 | −4.7682E−08 | −2.2400E−07 |
| D | −6.5428E−09 | −1.0727E−08 | −3.4680E−10 | 3.0540E−08 | 1.8331E−07 |
| E | −4.9707E−10 | −1.0273E−09 | −3.0278E−11 | 2.0416E−08 | 2.7228E−08 |
| F | −3.1330E−11 | −8.8556E−11 | 1.1227E−11 | 1.6373E−10 | 4.7133E−09 |
| G | −2.2801E−12 | −6.2404E−12 | 5.6861E−13 | −7.6874E−13 | 6.7809E−10 |
| H | −2.1100E−13 | −3.1669E−13 | −5.7758E−14 | −6.5107E−13 | −2.1905E−11 |
| J | −2.0935E−14 | 6.5628E−15 | −5.5717E−14 | −1.8042E−13 | −3.7065E−14 |

| | S9 | S10 | S11 | S12 | S13 |
|---|---|---|---|---|---|
| K | 1.6691E+01 | 8.5470E+01 | 1.9797E−01 | −1.1343E+00 | −3.3050E+01 |
| A | −5.3971E−04 | −4.3757E−04 | −7.3405E−04 | −1.4005E−03 | −3.1549E−04 |
| B | 3.3824E−05 | −1.8003E−05 | 3.2494E−06 | 2.9837E−06 | −8.3033E−05 |
| C | −4.9844E−07 | −3.2489E−06 | −1.6481E−05 | −5.6275E−06 | −3.4249E−05 |
| D | −6.5114E−07 | −1.0682E−06 | −6.0520E−06 | −7.4176E−06 | 1.8621E−06 |
| E | −7.7660E−08 | −4.4061E−07 | 4.7899E−08 | −3.8499E−08 | −6.5323E−08 |
| F | 1.0802E−09 | 1.1319E−09 | 1.1422E−09 | −3.2227E−10 | −2.5094E−09 |
| G | 1.1701E−09 | 2.7078E−10 | 1.4173E−10 | 3.0022E−11 | −2.1357E−10 |
| H | 1.3155E−11 | 1.9693E−12 | −1.8858E−12 | 7.0949E−12 | 8.8699E−12 |
| J | 4.0034E−13 | 2.8994E−13 | −6.3273E−12 | 1.5073E−12 | 5.0403E−12 |

The optical imaging system 100 described above may have the aberration characteristics illustrated in FIG. 2.

Figure 3:
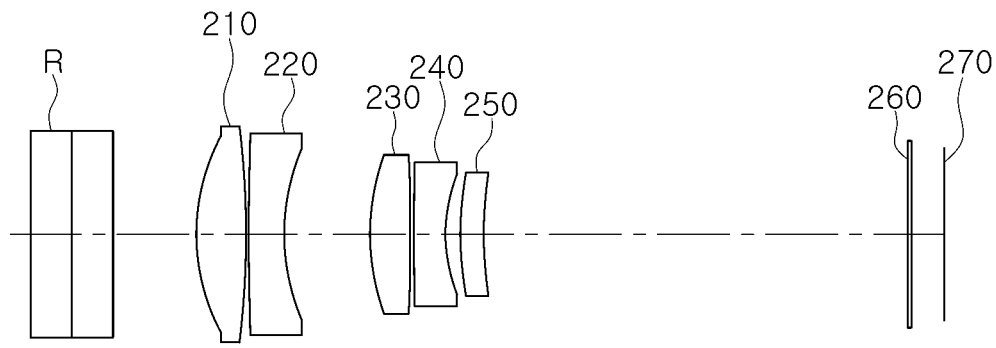
FIG. 3 is a view illustrating a second example of an optical imaging system.
Figure 4:
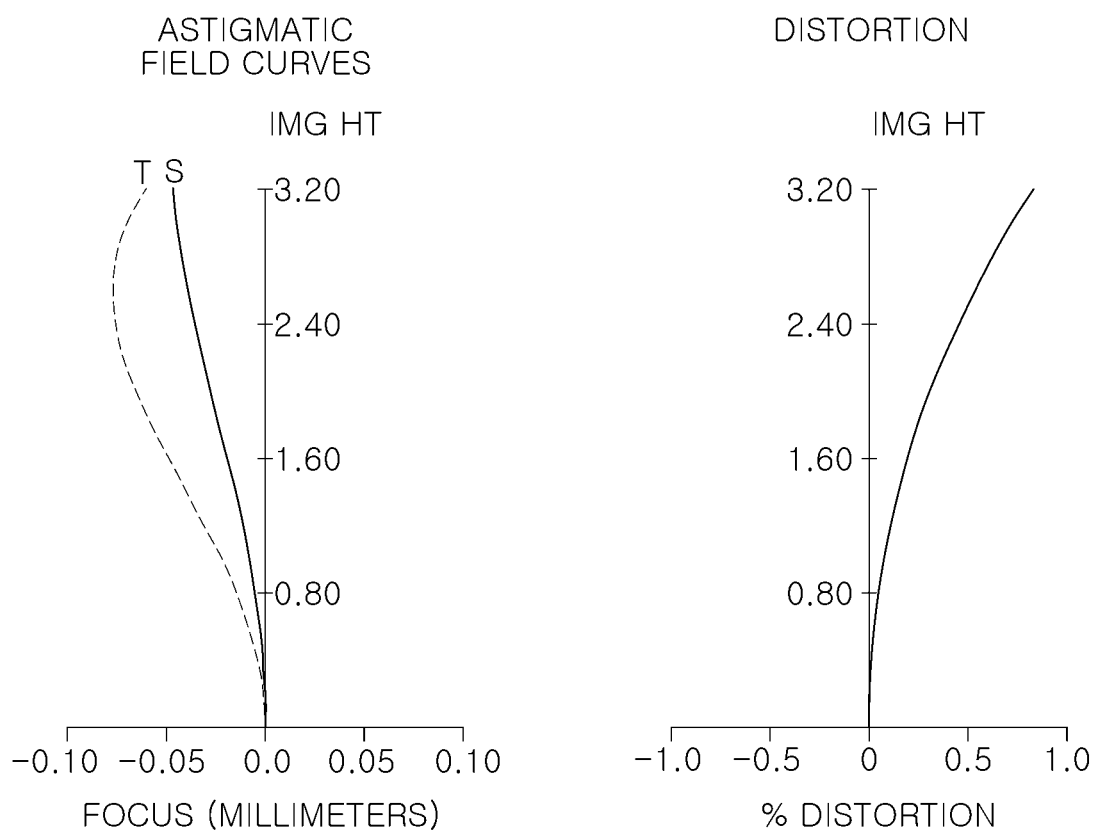
FIG. 4 is a view illustrating aberration characteristics of the optical imaging system illustrated in FIG. 3.

FIG. 3 is a view illustrating a second example of an optical imaging system, and FIG. 4 is a view illustrating aberration characteristics of the optical imaging system illustrated in FIG. 3.

Referring to FIG. 3, an optical imaging system 200 may include an optical system including a first lens 210, a second lens 220, a third lens 230, a fourth lens 240, and a fifth lens 250, and may further include a filter 260 and an image sensor 270.

In addition, the optical imaging system 200 may further include a reflecting member R disposed in front of the first lens 210 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 3 below. The thickness or distance is a thickness when it defines a distance between two surfaces of a lens or other element, and is a distance when it defines a distance between a surface of one lens or other element and a surface of a next lens or other element. The effective radius listed in Table 3 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

TABLE 3

| Surface No. | Element | Radius of Curvature | Thickness or Distance | Refractive Index | Abbe Number | Effective Radius | Focal Length |
|---|---|---|---|---|---|---|---|
| S1 | | Infinity | 5.500 | 1.723 | 29.5 | 6.000 | |
| S2 | Prism | Infinity | 5.500 | 1.723 | 29.5 | 8.485 | |
| S3 | | Infinity | 3.000 | | | 6.000 | |
| S4 | First | 7.02 | 1.800 | 1.534 | 55.7 | 3.500 | 11.117 |
| S5 | Lens | −36.25 | 0.093 | | | 3.376 | |
| S6 | Second | 78.04 | 1.321 | 1.641 | 23.9 | 3.274 | −13.009 |
| S7 | Lens | 7.49 | 3.100 | | | 2.895 | |
| S8 | Third | 8.17 | 1.444 | 1.679 | 19.2 | 2.588 | 11.542 |
| S9 | Lens | −176.02 | 0.150 | | | 2.399 | |
| S10 | Fourth | 198.60 | 1.147 | 1.641 | 23.9 | 2.336 | −9.341 |
| S11 | Lens | 5.80 | 0.542 | | | 2.032 | |
| S12 | Fifth | 10.70 | 0.850 | 1.546 | 56.1 | 2.000 | 166.430 |
| S13 | Lens | 11.79 | 15.391 | | | 2.001 | |
| S14 | Filter | Infinity | 0.110 | 1.519 | 64.2 | 3.103 | |
| S15 | | Infinity | 1.207 | | | 3.109 | |
| S16 | Imaging Plane | Infinity | | | | 3.201 | |

An overall focal length f of the optical imaging system 200 may be 30.9 mm, an Fno thereof may be 4.41, an IMG HT thereof may be 3.201 mm, and an FOV thereof may be 11.72°.

The first lens 210 may have a positive refractive power, and a first surface and a second surface thereof may be convex.

The second lens 220 may have a negative refractive power, and a first surface thereof may be convex while a second surface thereof may be concave.

The third lens 230 may have a positive refractive power, and a first surface and a second surface thereof may be convex.

The fourth lens 240 may have a negative refractive power, and a first surface thereof may be convex while a second surface thereof may be concave.

The fifth lens 250 may have a positive refractive power, and a first surface thereof may be convex while a second surface thereof may be concave.

The surfaces of the first to fifth lenses 210 to 250 may have the aspherical constants listed in Table 4 below. For example, both the object-side surface and the image-side surface of each of the first to fifth lenses 210 to 250 may be aspherical.

TABLE 4

| Constant | S4 | S5 | S6 | S7 | S8 |
|---|---|---|---|---|---|
| K | −6.5361E−01 | 2.5719E+00 | 9.0706E+01 | 1.9234E−01 | 3.8565E−01 |
| A | 5.6184E−05 | 1.2182E−04 | −2.1828E−04 | −4.9959E−04 | −3.9885E−04 |
| B | −6.4904E−07 | −2.0029E−06 | 9.1446E−06 | 3.2697E−06 | 9.9641E−06 |
| C | −1.5984E−07 | −1.2733E−07 | 1.5294E−08 | −2.3790E−07 | −4.7610E−07 |
| D | −1.2118E−08 | −1.1081E−08 | −4.7368E−10 | 7.1778E−09 | −3.4450E−08 |
| E | −7.4300E−10 | −9.6064E−10 | −5.7487E−11 | −3.3683E−10 | 4.0720E−10 |
| F | −3.9015E−11 | −7.5297E−11 | 6.7037E−12 | −7.9109E−11 | 2.7519E−10 |
| G | −2.1592E−12 | −4.7804E−12 | 4.5483E−13 | −8.1132E−12 | 4.9427E−11 |
| H | −1.5153E−13 | −2.1722E−13 | −1.0423E−13 | −4.2388E−13 | 4.2570E−12 |
| J | −1.4387E−14 | −4.5743E−17 | −2.9431E−14 | 4.7546E−14 | 4.5791E−14 |

| | S9 | S10 | S11 | S12 | S13 |
|---|---|---|---|---|---|
| K | −9.9000E+01 | 6.2043E+01 | 4.2011E−01 | −3.0227E+00 | −1.8374E+01 |
| A | −5.2825E−04 | −3.9623E−04 | −6.4492E−04 | −1.4402E−03 | −1.3156E−04 |
| B | 2.7769E−05 | 6.2703E−06 | 2.9076E−05 | 4.2906E−05 | 1.5880E−05 |
| C | 7.9321E−07 | 1.2443E−06 | −3.1610E−07 | 6.0292E−06 | −4.8548E−06 |
| D | 8.1817E−08 | −4.3633E−08 | −1.8954E−07 | −1.1750E−07 | −2.4647E−07 |
| E | 1.3933E−09 | −6.4548E−09 | −2.7157E−08 | −7.3975E−08 | −6.1644E−08 |
| F | −3.4575E−10 | −2.6596E−10 | 4.7351E−09 | −1.2970E−08 | −3.4931E−09 |
| G | −5.0797E−11 | −1.0423E−12 | 3.8157E−11 | −3.0685E−10 | −7.3604E−11 |
| H | −1.2369E−12 | −5.7055E−12 | −3.8758E−12 | −2.7900E−11 | −9.2153E−12 |
| J | 5.2035E−13 | −2.9999E−13 | −2.0707E−12 | −1.6919E−12 | −2.6592E−12 |

The optical imaging system 200 described above may have the aberration characteristics illustrated in FIG. 4.

Figure 5:
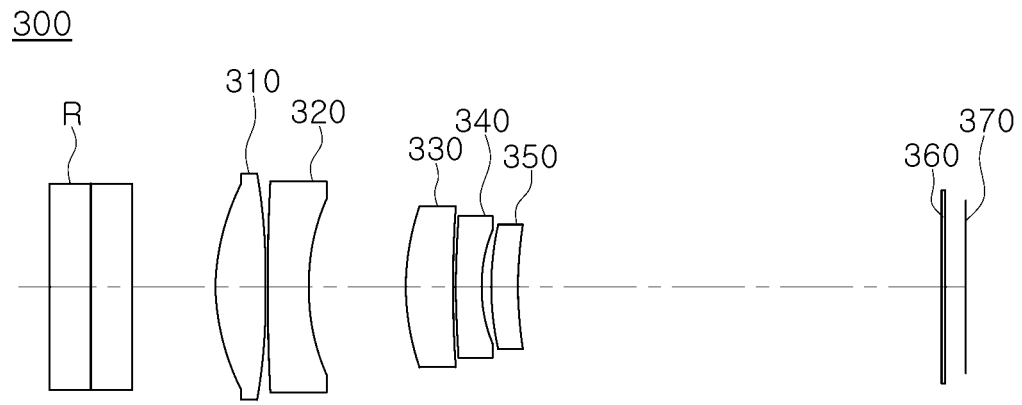
FIG. 5 is a view illustrating a third example of an optical imaging system.
Figure 6:
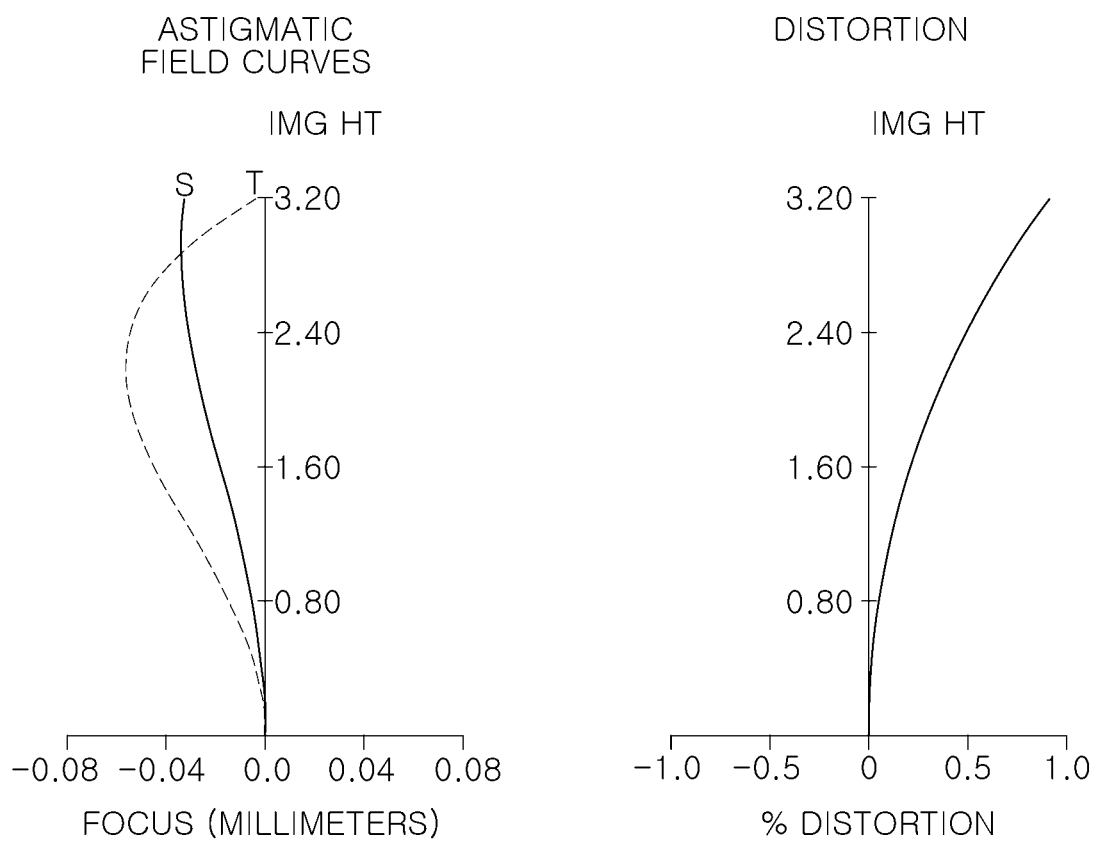
FIG. 6 is a view illustrating aberration characteristics of the optical imaging system illustrated in FIG. 5.

FIG. 5 is a view illustrating a third example of an optical imaging system, and FIG. 6 is a view illustrating aberration characteristics of the optical imaging system illustrated in FIG. 5.

Referring to FIG. 5, an optical imaging system 300 may include an optical system including a first lens 310, a second lens 320, a third lens 330, a fourth lens 340, and a fifth lens 350, and may further include a filter 360 and an image sensor 370.

In addition, the optical imaging system 300 may further include a reflecting member R disposed in front of the first lens 310 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 5 below. The thickness or distance is a thickness when it defines a distance between two surfaces of a lens or other element, and is a distance when it defines a distance between a surface of one lens or other element and a surface of a next lens or other element. The effective radius listed in Table 5 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

TABLE 5

| Surface No. | Element | Radius of Curvature | Thickness or Distance | Refractive Index | Abbe Number | Effective Radius | Focal Length |
|---|---|---|---|---|---|---|---|
| S1 | | Infinity | 5.500 | 1.723 | 29.5 | 6.000 | |
| S2 | Prism | Infinity | 5.500 | 1.723 | 29.5 | 8.485 | |
| S3 | | Infinity | 3.000 | | | 6.000 | |
| S4 | First | 7.32 | 1.800 | 1.534 | 55.7 | 3.650 | 11.586 |
| S5 | Lens | −37.84 | 0.096 | | | 3.543 | |
| S6 | Second | 70.08 | 1.490 | 1.641 | 23.9 | 3.430 | −14.174 |
| S7 | Lens | 7.98 | 3.508 | | | 3.010 | |
| S8 | Third | 8.19 | 1.743 | 1.689 | 18.1 | 2.605 | 14.782 |
| S9 | Lens | 38.25 | 0.077 | | | 2.330 | |
| S10 | Fourth | 29.36 | 0.944 | 1.641 | 23.9 | 2.299 | −10.604 |
| S11 | Lens | 5.45 | 0.354 | | | 2.038 | |
| S12 | Fifth | 9.08 | 0.961 | 1.546 | 56.1 | 2.025 | 79.631 |
| S13 | Lens | 11.04 | 15.391 | | | 2.025 | |
| S14 | Filter | Infinity | 0.110 | 1.519 | 64.2 | 3.137 | |
| S15 | | Infinity | 0.726 | | | 3.142 | |
| S16 | Imaging Plane | Infinity | | | | 3.201 | |

An overall focal length f of the optical imaging system 300 may be 30.8999 mm, an Fno thereof may be 4.23, an IMG HT thereof may be 3.201 mm, and an FOV thereof may be 11.71°.

The first lens 310 may have a positive refractive power, and a first surface and a second surface thereof may be convex.

The second lens 320 may have a negative refractive power, and a first surface thereof may be convex while a second surface thereof may be concave.

The third lens 330 may have a positive refractive power, and a first surface thereof may be convex while a second surface thereof may be concave.

The fourth lens 340 may have a negative refractive power, and a first surface thereof may be convex while a second surface thereof may be concave.

The fifth lens 350 may have a positive refractive power, and a first surface thereof may be convex while a second surface thereof may be concave.

The surfaces of the first to fifth lenses 310 to 350 may have the aspherical constants listed in Table 6 below. For example, both the object-side surface and the image-side surface of each of the first to fifth lenses 310 to 350 may be aspherical.

The optical imaging system 300 described above may have the aberration characteristics illustrated in FIG. 6.

Figure 7:
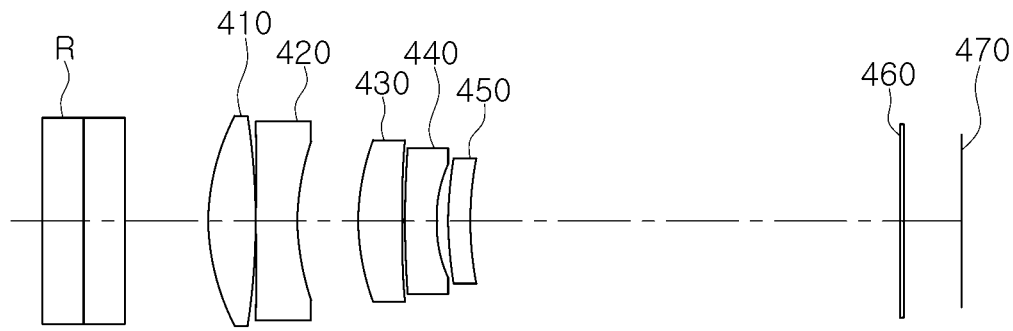
FIG. 7 is a view illustrating a fourth example of an optical imaging system.
Figure 8:
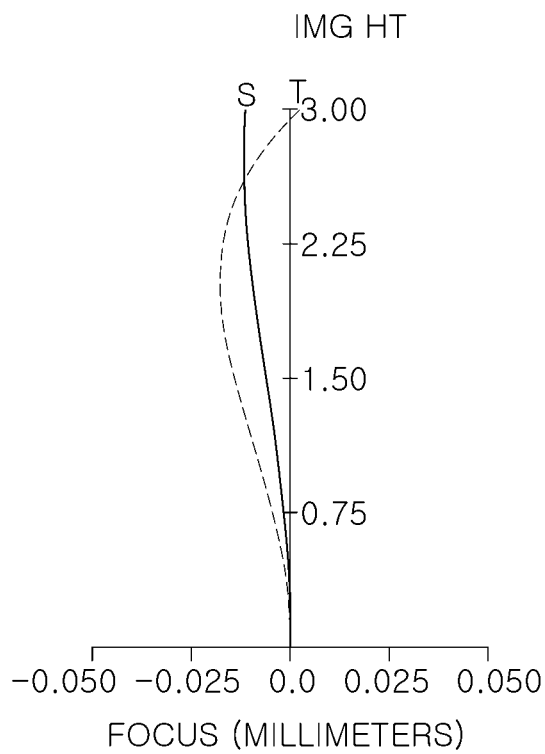
FIG. 8 is a view illustrating aberration characteristics of the optical imaging system illustrated in FIG. 7.
Figure 8:
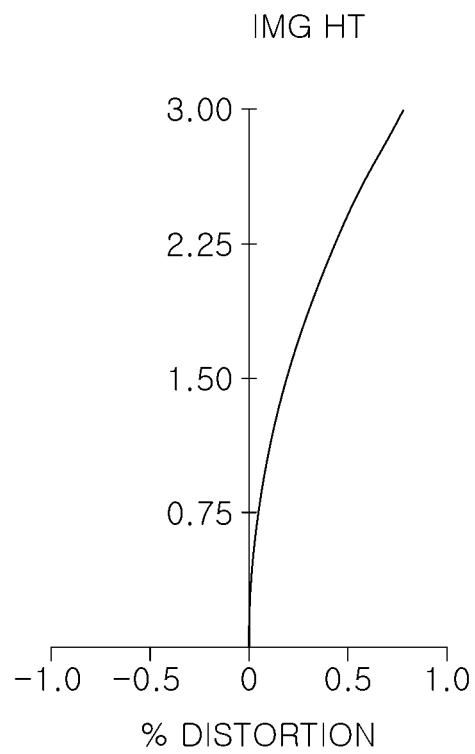

FIG. 7 is a view illustrating a fourth example of an optical imaging system, and FIG. 8 is a view illustrating aberration characteristics of the optical imaging system illustrated in FIG. 7.

Referring to FIG. 7, an optical imaging system 400 may include an optical system including a first lens 410, a second lens 420, a third lens 430, a fourth lens 440, and a fifth lens 450, and may further include a filter 460 and an image sensor 470.

In addition, the optical imaging system 400 may further include a reflecting member R disposed in front of the first lens 410 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 7 below. The thickness or distance is a thickness when it defines a distance between two surfaces of a lens or other element, and is a distance when it defines a distance between a surface of one lens or other element and a surface of a next lens or other element. The effective radius listed in Table 7 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

TABLE 6

| Constant | S4 | S5 | S6 | S7 | S8 |
|---|---|---|---|---|---|
| K | −6.6666E−01 | 3.0842E+00 | 9.0306E+01 | 1.8409E−01 | 3.7119E−01 |
| A | 5.1676E−05 | 1.2070E−04 | −2.1780E−04 | −5.0377E−04 | −4.0134E−04 |
| B | −1.2033E−06 | −2.0753E−06 | 9.0014E−06 | 3.8520E−06 | 8.3849E−06 |
| C | −1.8324E−07 | −1.4824E−07 | 1.9946E−08 | −1.7182E−07 | −6.9363E−07 |
| D | −1.2739E−08 | −1.3137E−08 | 8.2929E−10 | 1.4156E−08 | −6.3337E−08 |
| E | −7.5705E−10 | −1.1001E−09 | 8.7538E−11 | 3.7905E−10 | −3.1371E−09 |
| F | −3.9300E−11 | −8.2388E−11 | 1.9326E−11 | −1.4520E−11 | −1.0750E−10 |
| G | −2.2745E−12 | −4.9213E−12 | 1.4886E−12 | −4.0433E−12 | 2.2533E−11 |
| H | −1.7483E−13 | −1.9949E−13 | −2.9539E−14 | −3.4534E−13 | 3.9981E−12 |
| J | −1.7399E−14 | 3.7210E−15 | −2.4108E−14 | 1.4245E−14 | 3.2822E−13 |

| | S9 | S10 | S11 | S12 | S13 |
|---|---|---|---|---|---|
| K | −8.9279E+01 | −1.0626E+01 | 4.2034E−01 | −3.0095E+00 | −1.7399E+01 |
| A | −5.1849E−04 | −4.0040E−04 | −6.3967E−04 | −1.4329E−03 | −1.0286E−04 |
| B | 2.9499E−05 | 4.9437E−06 | 2.5863E−05 | 4.7813E−05 | 8.4141E−06 |
| C | 9.5107E−07 | 1.0595E−06 | −1.7595E−06 | 7.0860E−06 | −7.6707E−06 |
| D | 1.0003E−07 | −8.6072E−08 | −4.3498E−07 | −9.6807E−08 | −6.8793E−07 |
| E | 3.0212E−09 | −1.5035E−08 | −6.1944E−08 | −1.0469E−07 | −6.9569E−08 |
| F | −4.8693E−10 | −1.4101E−09 | −2.7883E−09 | −2.3404E−08 | 2.1739E−08 |
| G | −1.8628E−10 | −1.4667E−10 | 3.8157E−11 | −3.0685E−10 | −7.3604E−11 |
| H | −4.1188E−11 | 1.7131E−12 | −3.8758E−12 | −2.7900E−11 | −9.2153E−12 |
| J | −7.5594E−12 | −2.9999E−13 | −2.0707E−12 | −1.6919E−12 | −2.6592E−12 |

TABLE 7

| Surface No. | Element | Radius of Curvature | Thickness or Distance | Refractive Index | Abbe Number | Effective Radius | Focal Length |
|---|---|---|---|---|---|---|---|
| S1 |  | Infinity | 5.500 | 1.723 | 29.5 | 6.000 |  |
| S2 | Prism | Infinity | 5.500 | 1.723 | 29.5 | 8.485 |  |
| S3 |  | Infinity | 3.000 |  |  | 6.000 |  |
| S4 | First | 7.09 | 1.700 | 1.534 | 55.7 | 3.360 | 10.596 |
| S5 | Lens | −26.40 | 0.030 |  |  | 3.253 |  |
| S6 | Second | −345.38 | 1.468 | 1.641 | 23.9 | 3.183 | −12.028 |
| S7 | Lens | 7.90 | 2.184 |  |  | 2.805 |  |
| S8 | Third | 7.75 | 1.600 | 1.689 | 18.1 | 2.603 | 13.525 |
| S9 | Lens | 42.24 | 0.052 |  |  | 2.375 |  |
| S10 | Fourth | 24.36 | 1.166 | 1.641 | 23.9 | 2.345 | −10.814 |
| S11 | Lens | 5.30 | 0.399 |  |  | 2.040 |  |
| S12 | Fifth | 9.98 | 0.800 | 1.546 | 56.1 | 2.025 | 130.784 |
| S13 | Lens | 11.28 | 15.391 |  |  | 2.022 |  |
| S14 | Filter | Infinity | 0.110 | 1.519 | 64.2 | 3.050 |  |
| S15 |  | Infinity | 2.095 |  |  | 3.054 |  |
| S16 | Imaging Plane | Infinity |  |  |  | 3.002 |  |

An overall focal length f of the optical imaging system 400 may be 30.9 mm, an Fno thereof may be 4.59, an IMG HT thereof may be 3.002 mm, and an FOV thereof may be 11°.

The first lens 410 may have a positive refractive power, and a first surface and a second surface thereof may be convex.

The second lens 420 may have a negative refractive power, and a first surface and a second surface thereof may be concave.

The third lens 430 may have a positive refractive power, and a first surface thereof may be convex while a second surface thereof may be concave.

The fourth lens 440 may have a negative refractive power, and a first surface thereof may be convex while a second surface thereof may be concave.

The fifth lens 450 may have a positive refractive power, and a first surface thereof may be convex while a second surface thereof may be concave.

The surfaces of the first to fifth lenses 410 to 450 may have the aspherical constants listed in Table 8 below. For example, both the object-side surface and the image-side surface of each of the first to fifth lenses 410 to 450 may be aspherical.

TABLE 8

| Constant | S4 | S5 | S6 | S7 | S8 |
|---|---|---|---|---|---|
| K | −6.4514E−01 | 4.9409E+00 | 9.2651E+01 | 1.6729E−01 | 3.7644E−01 |
| A | 5.9932E−05 | 1.1347E−04 | −2.1891E−04 | −5.0954E−04 | −3.9956E−04 |
| B | −1.0771E−06 | −2.2466E−06 | 8.3291E−06 | 4.1615E−06 | 7.1574E−06 |
| C | −1.9296E−07 | −1.7171E−07 | −3.4417E−08 | −2.4262E−07 | −7.4946E−07 |
| D | −1.4371E−08 | −1.5643E−08 | −2.0727E−09 | −6.1454E−09 | −4.3888E−08 |
| E | −9.5804E−10 | −1.2824E−09 | −9.6968E−11 | −2.4456E−09 | 1.4195E−09 |
| F | −6.1079E−11 | −9.1140E−11 | 5.1145E−12 | −2.8131E−10 | 4.6031E−10 |
| G | −4.0850E−12 | −6.2657E−12 | 3.5166E−13 | −1.4895E−11 | 1.0284E−10 |
| H | −3.0893E−13 | −3.2326E−13 | −1.0695E−13 | 1.0570E−12 | 5.8761E−12 |
| J | −2.6629E−14 | −8.6701E−15 | −2.4300E−14 | 4.2535E−13 | −8.6118E−13 |

| | S9 | S10 | S11 | S12 | S13 |
|---|---|---|---|---|---|
| K | −8.7877E+01 | −9.2153E+00 | 4.1601E−01 | −3.0371E+00 | −1.6151E+01 |
| A | −5.1704E−04 | −3.9390E−04 | −6.4095E−04 | −1.4317E−03 | −5.6338E−05 |
| B | 3.0357E−05 | 5.9969E−06 | 2.1375E−05 | 5.7248E−05 | 1.0776E−06 |
| C | 9.7261E−07 | 1.2907E−06 | −2.3382E−06 | 7.7176E−06 | −7.5630E−06 |
| D | 9.1014E−08 | −5.5508E−08 | −4.0431E−07 | −5.9569E−07 | 2.3592E−07 |
| E | 2.7232E−09 | −1.4863E−08 | −6.9652E−08 | −3.0524E−07 | 6.7629E−08 |
| F | −1.4709E−09 | −2.9439E−09 | −2.4444E−08 | −5.0584E−08 | −6.0711E−08 |
| G | −2.8663E−10 | −1.3591E−10 | 3.8157E−11 | −3.0685E−10 | −7.3604E−11 |
| H | −2.9285E−11 | −2.1436E−11 | −3.8758E−12 | −2.7900E−11 | −9.2153E−12 |
| J | −1.9695E−12 | −2.9999E−13 | −2.0707E−12 | −1.6919E−12 | −2.6592E−12 |

The optical imaging system 400 described above may have the aberration characteristics illustrated in FIG. 8.

Figure 9:
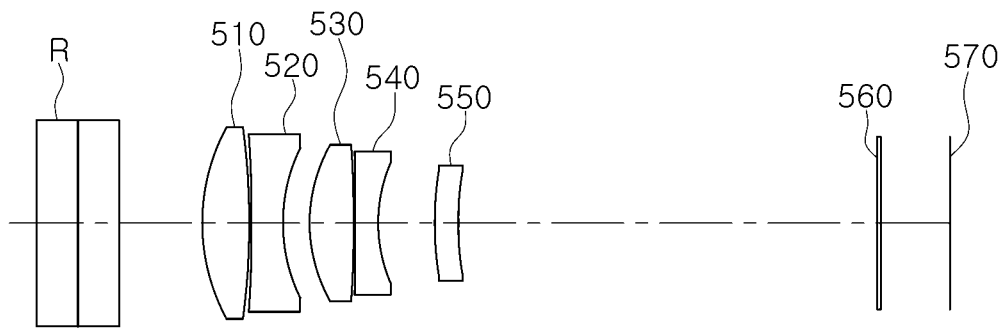
FIG. 9 is a view illustrating a fifth example of an optical imaging system.
Figure 10:
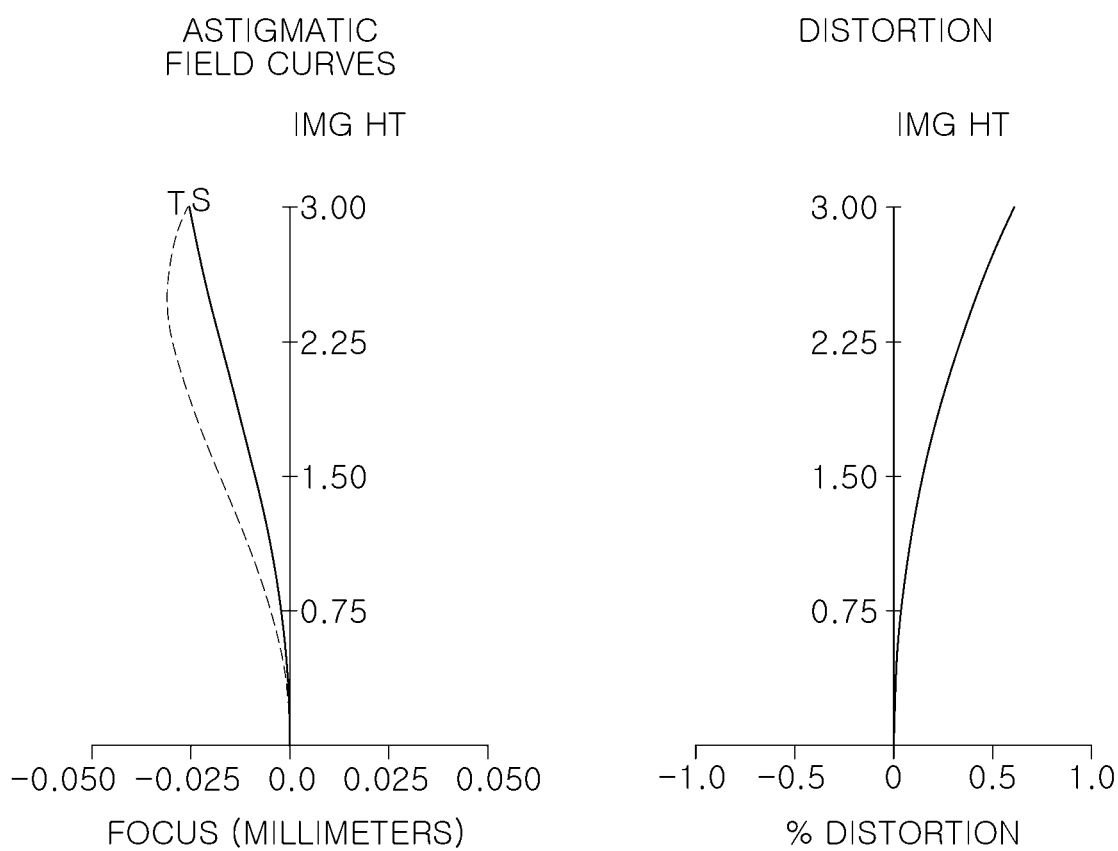
FIG. 10 is a view illustrating aberration characteristics of the optical imaging system illustrated in FIG. 9.

FIG. 9 is a view illustrating a fifth example of an optical imaging system, and FIG. 10 is a view illustrating aberration characteristics of the optical imaging system illustrated in FIG. 9.

Referring to FIG. 9, an optical imaging system 500 may include an optical system including a first lens 510, a second lens 520, a third lens 530, a fourth lens 540, and a fifth lens 550, and may further include a filter 560 and an image sensor 570.

In addition, the optical imaging 500 may further include a reflecting member R disposed in front of the first lens 510 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 9 below. The thickness or distance is a thickness when it defines a distance between two surfaces of a lens or other element, and is a distance when it defines a distance between a surface of one lens or other element and a surface of a next lens or other element. The effective radius listed in Table 9 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

An overall focal length f of the optical imaging system 500 may be 30.9005 mm, an Fno thereof may be 5.00, an IMG HT thereof may be 3.001 mm, and an FOV thereof may be 11.02°.

The first lens 510 may have a positive refractive power, and a first surface and a second surface thereof may be convex.

The second lens 520 may have a negative refractive power, and a first surface and a second surface thereof may be concave.

The third lens 530 may have a positive refractive power, and a first surface and a second surface thereof may be convex.

The fourth lens 540 may have a negative refractive power, and a first surface thereof may be convex while a second surface thereof may be concave.

The fifth lens 550 may have a positive refractive power, and a first surface thereof may be convex while a second surface thereof may be concave.

The surfaces of the first to fifth lenses 510 to 550 may have the aspherical constants listed in Table 10 below. For example, both the object-side surface and the image-side surface of each of the first to fifth lenses 510 to 550 may be aspherical.

TABLE 9

| Surface No. | Element | Radius of Curvature | Thickness or Distance | Refractive Index | Abbe Number | Effective Radius | Focal Length |
|---|---|---|---|---|---|---|---|
| S1 |  | Infinity | 5.500 | 1.723 | 29.5 | 6.000 |  |
| S2 | Prism | Infinity | 5.500 | 1.723 | 29.5 | 8.485 |  |
| S3 |  | Infinity | 3.000 |  |  | 6.000 |  |
| S4 | First | 6.96 | 1.723 | 1.534 | 55.7 | 3.157 | 10.316 |
| S5 | Lens | −24.79 | 0.030 |  |  | 2.982 |  |
| S6 | Second | −88.03 | 1.211 | 1.646 | 23.5 | 2.914 | −8.914 |
| S7 | Lens | 6.19 | 0.961 |  |  | 2.596 |  |
| S8 | Third | 5.73 | 1.600 | 1.668 | 20.4 | 2.585 | 8.086 |
| S9 | Lens | −83.62 | 0.061 |  |  | 2.399 |  |
| S10 | Fourth | 343.53 | 0.887 | 1.641 | 23.9 | 2.362 | −9.009 |
| S11 | Lens | 5.67 | 2.062 |  |  | 2.096 |  |
| S12 | Fifth | 11.55 | 0.866 | 1.546 | 56.1 | 1.900 | 779.386 |
| S13 | Lens | 11.56 | 15.391 |  |  | 1.892 |  |
| S14 | Filter | Infinity | 0.110 | 1.519 | 64.2 | 2.836 |  |
| S15 |  | Infinity | 2.593 |  |  | 2.841 |  |
| S16 | Imaging Plane | Infinity |  |  |  | 3.001 |  |

TABLE 10

| Constant | S4 | S5 | S6 | S7 | S8 |
|---|---|---|---|---|---|
| K | −5.8618E−01 | 8.7158E+00 | 9.1941E+01 | 2.3579E−01 | 2.9423E−01 |
| A | 8.1196E−05 | 9.2738E−05 | −2.3517E−04 | −4.8086E−04 | −4.6025E−04 |
| B | −1.9255E−07 | −3.5518E−06 | 8.4447E−06 | 3.9823E−06 | 5.4949E−06 |
| C | −2.2298E−07 | −1.9922E−07 | 2.5572E−08 | −2.6231E−07 | −9.3083E−07 |
| D | −2.0896E−08 | −1.5570E−08 | 6.8922E−09 | −9.1091E−09 | −7.9611E−08 |
| E | −1.5485E−09 | −1.3754E−09 | 1.1253E−09 | −3.0662E−09 | −2.9612E−09 |
| F | −1.0826E−10 | −7.6006E−11 | 1.4809E−10 | −4.3528E−10 | 3.2813E−11 |
| G | −8.1894E−12 | −3.4294E−12 | 1.2952E−11 | −3.3915E−11 | 6.2003E−11 |
| H | −6.7451E−13 | 1.0288E−14 | 9.2687E−13 | −2.0589E−14 | 4.4028E−12 |
| J | −5.2770E−14 | 4.7227E−14 | 7.0043E−14 | 6.9990E−13 | −6.2760E−13 |

| Constant | S9 | S10 | S11 | S12 | S13 |
|---|---|---|---|---|---|
| K | 9.8796E+01 | −8.8633E−01 | 4.4640E−01 | −2.1239E+00 | −1.4399E+01 |
| A | −4.7208E−04 | −4.3774E−04 | −5.7998E−04 | −1.3732E−03 | 6.4066E−05 |
| B | 2.9454E−05 | 5.9945E−06 | 1.5250E−05 | 5.9784E−05 | 4.5862E−05 |
| C | 8.7758E−07 | 1.0697E−06 | −3.8150E−06 | 4.7158E−06 | 8.0183E−07 |
| D | 1.0133E−07 | −1.3568E−07 | −9.2744E−07 | −1.6715E−06 | −1.3426E−07 |
| E | 2.0857E−11 | −2.2162E−08 | −2.1649E−07 | −4.7349E−07 | −7.4765E−07 |
| F | −8.7905E−10 | −3.0056E−09 | −4.6230E−08 | −5.3197E−08 | −8.3052E−09 |
| G | −1.6688E−10 | −6.3930E−10 | 1.9087E−09 | −6.8002E−10 | −7.3604E−11 |
| H | −4.5853E−11 | −1.0614E−10 | −3.7435E−11 | −2.7900E−11 | −9.2153E−12 |
| J | −3.1094E−12 | 1.2151E−12 | −2.0707E−12 | −1.6919E−12 | −2.6592E−12 |

The optical imaging system 500 described above may have the aberration characteristics illustrated in FIG. 10.

Figure 11:
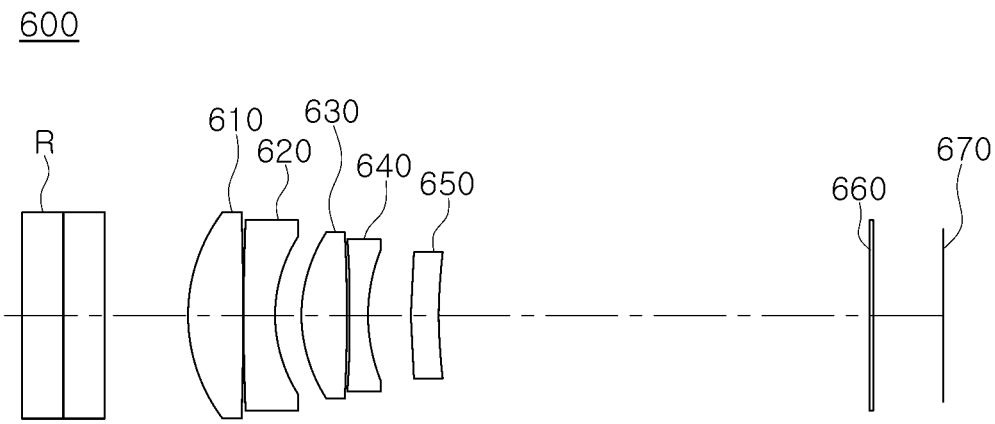
FIG. 11 is a view illustrating a sixth example of an optical imaging system.
Figure 12:
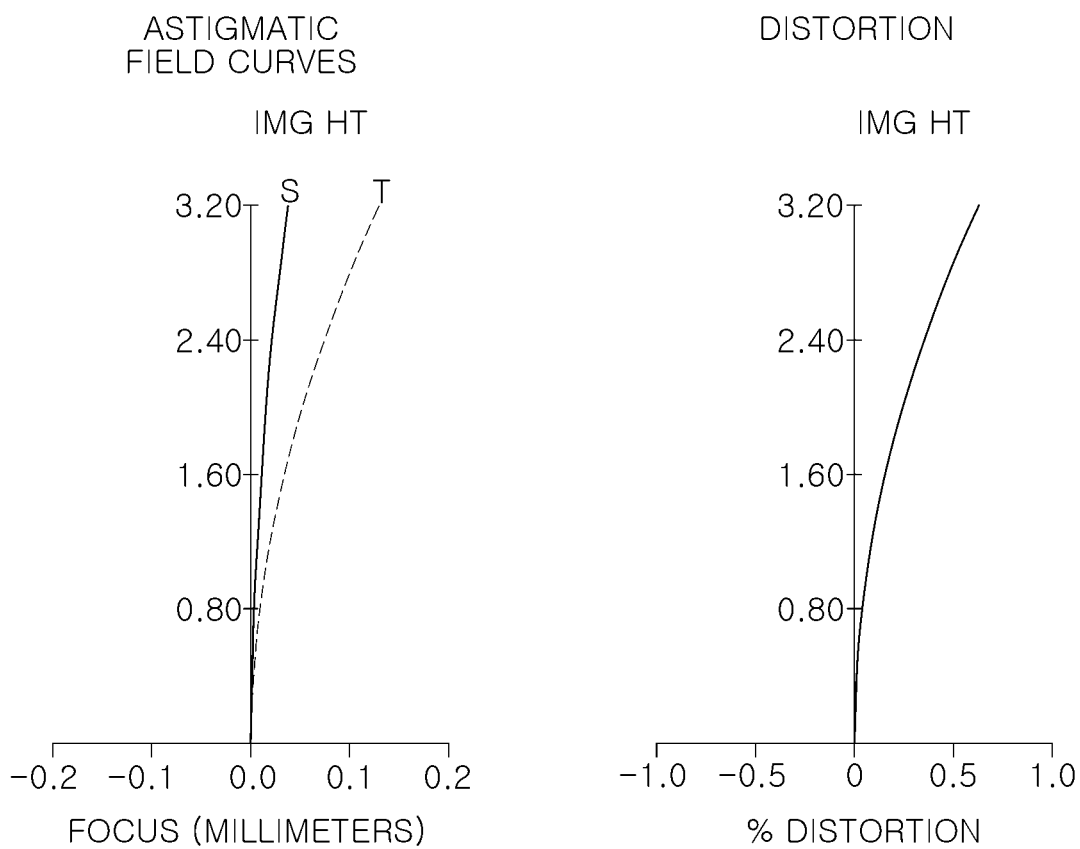
FIG. 12 is a view illustrating aberration characteristics of the optical imaging system illustrated in FIG. 11.

FIG. 11 is a view illustrating a sixth example of an optical imaging system, and FIG. 12 is a view illustrating aberration characteristics of the optical imaging system illustrated in FIG.

Referring to FIG. 11, an optical imaging system 600 may include an optical system including a first lens 610, a second lens 620, a third lens 630, a fourth lens 640, and a fifth lens 650, and may further include a filter 660 and an image sensor 670.

In addition, the optical imaging system 600 may further include a reflecting member R disposed in front of the first lens 610 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 11 below. The thickness or distance is a thickness when it defines a distance between two surfaces of a lens or other element, and is a distance when it defines a distance between a surface of one lens or other element and a surface of a next lens or other element. The effective radius listed in Table 11 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

TABLE 11

| Surface No. | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 6.000 | |
| S2 | | Infinity | 5.500 | 1.723 | 29.5 | 8.485 | |
| S3 | | Infinity | 3.000 | | | 6.000 | |
| S4 | First | 5.83 | 1.993 | 1.534 | 55.7 | 3.300 | 10.112 |
| S5 | Lens | −70.76 | 0.035 | | | 3.095 | |
| S6 | Second | 249.32 | 1.106 | 1.646 | 23.5 | 3.058 | −7.875 |
| S7 | Lens | 4.97 | 0.948 | | | 2.649 | |
| S8 | Third | 5.36 | 1.599 | 1.668 | 20.4 | 2.659 | 7.159 |
| S9 | Lens | −39.09 | 0.074 | | | 2.480 | |
| S10 | Fourth | −100.72 | 0.682 | 1.641 | 23.9 | 2.438 | −8.397 |
| S11 | Lens | 5.74 | 1.561 | | | 2.189 | |
| S12 | Fifth | 15.82 | 1.000 | 1.546 | 56.1 | 2.031 | 328.588 |
| S13 | Lens | 16.96 | 15.391 | | | 1.940 | |
| S14 | Filter | Infinity | 0.110 | 1.519 | 64.2 | 3.024 | |
| S15 | | Infinity | 2.499 | | | 3.029 | |
| S16 | Imaging Plane | Infinity | | | | 3.206 | |

An overall focal length f of the optical imaging system 600 may be 30.6 mm, an Fno thereof may be 4.64, an IMG HT thereof may be 3.206 mm, and an FOV thereof may be 11.87°.

The first lens 610 may have a positive refractive power, and a first surface and a second surface thereof may be convex.

The second lens 620 may have a negative refractive power, and a first surface thereof may be convex while a second surface thereof may be concave.

The third lens 630 may have a positive refractive power, and a first surface and a second surface thereof may be convex.

The fourth lens 640 may have a negative refractive power, and a first surface and a second surface thereof may be concave.

The fifth lens 650 may have a positive refractive power, and a first surface thereof may be convex while a second surface thereof may be concave.

The surfaces of the first to fifth lenses 610 to 650 may have the aspherical constants listed in Table 12 below. For example, both the object-side surface and the image-side surface of each of the first, second, third, and fifth lenses 610, 620, 630, and 650 may be aspherical, and the image-side surface of the fourth lens 640 may be aspherical.

The optical imaging system 600 described above may have the aberration characteristics illustrated in FIG. 12.

Figure 13:
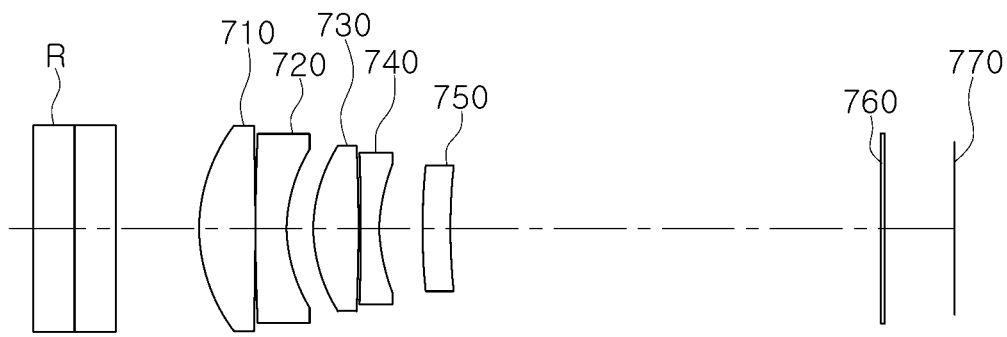
FIG. 13 is a view illustrating a seventh example of an optical imaging system.
Figure 14:
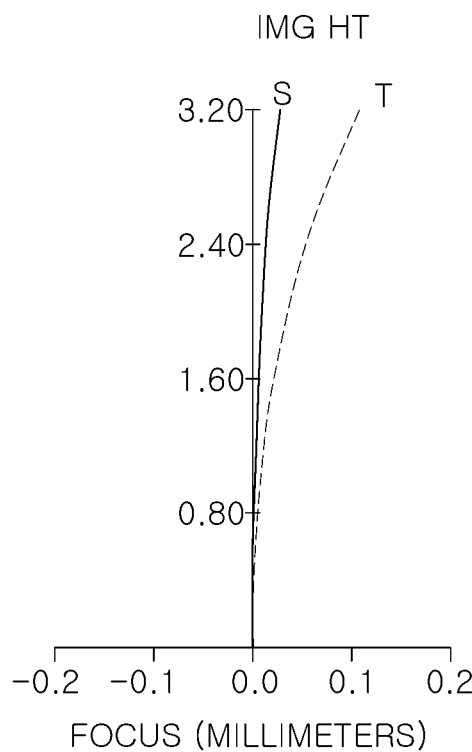
FIG. 14 is a view illustrating aberration characteristics of the optical imaging system illustrated in FIG. 13.
Figure 14:
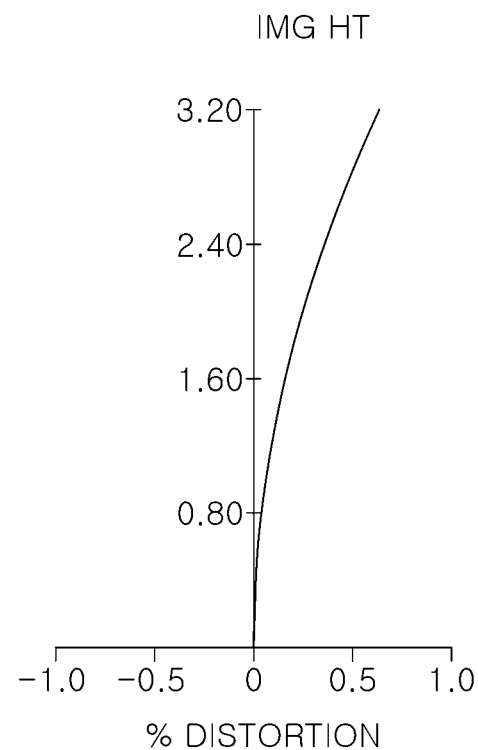

FIG. 13 is a view illustrating a seventh example of an optical imaging system, and FIG. 14 is a view illustrating aberration characteristics of the optical imaging system illustrated in FIG. 13.

Referring to FIG. 13, an optical imaging system 700 may include an optical system including a first lens 710, a second lens 720, a third lens 730, a fourth lens 740, and a fifth lens 750, and may further include a filter 760 and an image sensor 770.

In addition, the optical imaging system 700 may further include a reflecting member R disposed in front of the first lens 710 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 13 below. The thickness or distance is a thickness when it defines a distance between two surfaces of a lens or other element, and is a distance when it defines a distance between a surface of one lens or other element and a surface of a next lens or other element. The effective radius listed in Table 13 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

TABLE 12

| Constant | S4 | S5 | S6 | S7 | S8 |
|---|---|---|---|---|---|
| K | −4.4733E−01 | −7.8389E+00 | 9.9000E+01 | 1.5108E−01 | 3.7211E−01 |
| A | 1.5397E−04 | 1.0797E−04 | −1.9296E−04 | −5.4020E−04 | −4.0178E−04 |
| B | 5.3814E−06 | 1.5024E−07 | 1.1757E−05 | −2.9744E−06 | 1.3631E−05 |
| C | 1.3136E−07 | 2.8275E−07 | 1.8509E−07 | −5.7508E−07 | −3.3591E−07 |
| D | 9.4562E−10 | 2.7428E−08 | 1.1105E−08 | 3.4314E−08 | −9.0677E−08 |
| E | 8.3128E−11 | 1.4676E−09 | 1.2581E−09 | 5.2191E−09 | −7.5636E−09 |
| F | 2.1504E−11 | 5.3050E−11 | 1.3962E−10 | 4.6523E−10 | −6.0163E−10 |
| G | 2.2129E−12 | −6.2149E−12 | 1.5276E−11 | 4.2533E−12 | 2.2294E−11 |
| H | −7.0435E−14 | −1.1921E−12 | 9.7723E−13 | −4.5167E−12 | 5.8538E−12 |
| J | −8.0225E−14 | 1.0117E−13 | 1.0704E−14 | −3.8053E−13 | −1.3481E−13 |

| | S9 | S10 | S11 | S12 | S13 |
|---|---|---|---|---|---|
| K | −6.2207E+01 | 0.0000E+00 | 4.2974E−01 | −7.3973E+00 | −2.4785E+01 |
| A | 8.7551E−06 | 0.0000E+00 | −5.9912E−04 | −1.5743E−03 | −4.4688E−04 |
| B | 6.8135E−05 | 0.0000E+00 | 1.5161E−05 | −2.4746E−05 | −6.6957E−05 |
| C | −1.7282E−06 | 0.0000E+00 | −3.5285E−06 | −9.7312E−06 | −2.1472E−05 |
| D | −4.6886E−07 | 0.0000E+00 | −7.2565E−07 | −3.2992E−06 | 3.3558E−06 |
| E | 1.5444E−08 | 0.0000E+00 | −2.0232E−07 | −3.9745E−07 | −7.0986E−07 |
| F | 1.2137E−08 | 0.0000E+00 | −4.7674E−08 | 3.9234E−08 | 6.0399E−08 |
| G | −1.5052E−09 | 0.0000E+00 | 6.1783E−10 | −6.7656E−11 | −7.3599E−11 |
| H | 1.6873E−10 | 0.0000E+00 | 3.0882E−10 | −2.7900E−11 | −9.2151E−12 |
| J | −5.4027E−12 | 0.0000E+00 | 1.2450E−12 | −1.6919E−12 | −2.6592E−12 |

TABLE 13

| Surface No. | Element | Radius of Curvature | Thickness or Distance | Refractive Index | Abbe Number | Effective Radius | Focal Length |
|---|---|---|---|---|---|---|---|
| S1 |  | Infinity | 5.500 | 1.723 | 29.5 | 6.000 |  |
| S2 | Prism | Infinity | 5.500 | 1.723 | 29.5 | 8.485 |  |
| S3 |  | Infinity | 3.000 |  |  | 6.000 |  |
| S4 | First | 5.87 | 1.974 | 1.546 | 56.0 | 3.300 | 9.974 |
| S5 | Lens | −66.56 | 0.100 |  |  | 3.098 |  |
| S6 | Second | 872.52 | 1.112 | 1.646 | 23.5 | 3.020 | −7.690 |
| S7 | Lens | 4.93 | 1.427 |  |  | 2.601 |  |
| S8 | Third | 5.32 | 1.606 | 1.668 | 20.4 | 2.621 | 7.105 |
| S9 | Lens | −39.07 | 0.100 |  |  | 2.439 |  |
| S10 | Fourth | −100.24 | 0.572 | 1.641 | 23.9 | 2.387 | −8.393 |
| S11 | Lens | 5.74 | 1.560 |  |  | 2.166 |  |
| S12 | Fifth | 15.92 | 1.016 | 1.546 | 56.1 | 2.010 | 273.055 |
| S13 | Lens | 17.42 | 15.391 |  |  | 1.940 |  |
| S14 | Filter | Infinity | 0.110 | 1.519 | 64.2 | 3.029 |  |
| S15 |  | Infinity | 2.284 |  |  | 3.034 |  |
| S16 | Imaging Plane | Infinity |  |  |  | 3.200 |  |

An overall focal length f of the optical imaging system 700 may be 30.2572 mm, an Fno thereof may be 4.64, an IMG HT thereof may be 3.200 mm, and an FOV thereof may be 11.87°.

The first lens 710 may have a positive refractive power, and a first surface and a second surface thereof may be convex.

The second lens 720 may have a negative refractive power, and a first surface thereof may be convex while a second surface thereof may be concave.

The third lens 730 may have a positive refractive power, and a first surface and a second surface thereof may be convex.

The fourth lens 740 may have a negative refractive power, and a first surface and a second surface thereof may be concave.

The fifth lens 750 may have a positive refractive power, and a first surface thereof may be convex while a second surface thereof may be concave.

The surfaces of the first to fifth lenses 710 to 750 may have the aspherical constants listed in Table 14 below. For example, both the object-side surface and the image-side surface of each of the first, second, third, and fifth lenses 710, 720, 730, and 750 may be aspherical, and the image-side surface of the fourth lens 740 may be aspherical.

TABLE 14

| Constant | S4 | S5 | S6 | S7 | S8 |
|---|---|---|---|---|---|
| K | −4.4411E−01 | −7.8389E+00 | 9.9000E+01 | 1.5108E−01 | 3.7211E−01 |
| A | 1.7818E−04 | 1.0797E−04 | −1.9296E−04 | −5.4020E−04 | −4.0178E−04 |
| B | −1.4556E−05 | 1.5024E−07 | 1.1757E−05 | −2.9744E−06 | 1.3631E−05 |
| C | 9.3807E−06 | 2.8275E−07 | 1.8509E−07 | −5.7508E−07 | −3.3591E−07 |
| D | −2.5674E−06 | 2.7428E−08 | 1.1105E−08 | 3.4314E−08 | −9.0677E−08 |
| E | 4.4697E−07 | 1.4676E−09 | 1.2581E−09 | 5.2191E−09 | −7.5636E−09 |
| F | −4.8911E−08 | 5.3050E−11 | 1.3962E−10 | 4.6523E−10 | −6.0163E−10 |
| G | 3.2755E−09 | −6.2149E−12 | 1.5276E−11 | 4.2533E−12 | 2.2294E−11 |
| H | −1.2241E−10 | −1.1921E−12 | 9.7723E−13 | −4.5167E−12 | 5.8538E−12 |
| J | 1.8899E−12 | 1.0117E−13 | 1.0704E−14 | −3.8053E−13 | −1.3481E−13 |

| | S9 | S10 | S11 | S12 | S13 |
|---|---|---|---|---|---|
| K | −6.2207E+01 | 0.0000E+00 | 4.2974E−01 | −7.3973E+00 | −2.4785E+01 |
| A | 8.7551E−06 | 0.0000E+00 | −5.9912E−04 | −1.5743E−03 | −4.4688E−04 |
| B | 6.8135E−05 | 0.0000E+00 | 1.5161E−05 | −2.4746E−05 | −6.6957E−05 |
| C | −1.7282E−06 | 0.0000E+00 | −3.5285E−06 | −9.7312E−06 | −2.1472E−05 |
| D | −4.6886E−07 | 0.0000E+00 | −7.2565E−07 | −3.2992E−06 | 3.3558E−06 |
| E | 1.5444E−08 | 0.0000E+00 | −2.0232E−07 | −3.9745E−07 | −7.0986E−07 |
| F | 1.2137E−08 | 0.0000E+00 | −4.7674E−08 | 3.9234E−08 | 6.0399E−08 |
| G | −1.5052E−09 | 0.0000E+00 | 6.1783E−10 | −6.7656E−11 | −7.3599E−11 |
| H | 1.6873E−10 | 0.0000E+00 | 3.0882E−10 | −2.7900E−11 | −9.2151E−12 |
| J | −5.4027E−12 | 0.0000E+00 | 1.2450E−12 | −1.6919E−12 | −2.6592E−12 |

The optical imaging system 700 described above may have the aberration characteristics illustrated in FIG. 14.

Figure 16:
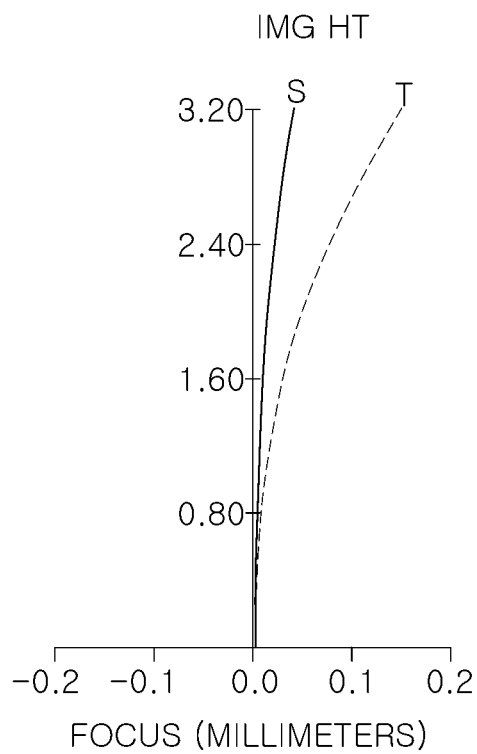
FIG. 16 is a view illustrating aberration characteristics of the optical imaging system illustrated in FIG. 15.
Figure 16:
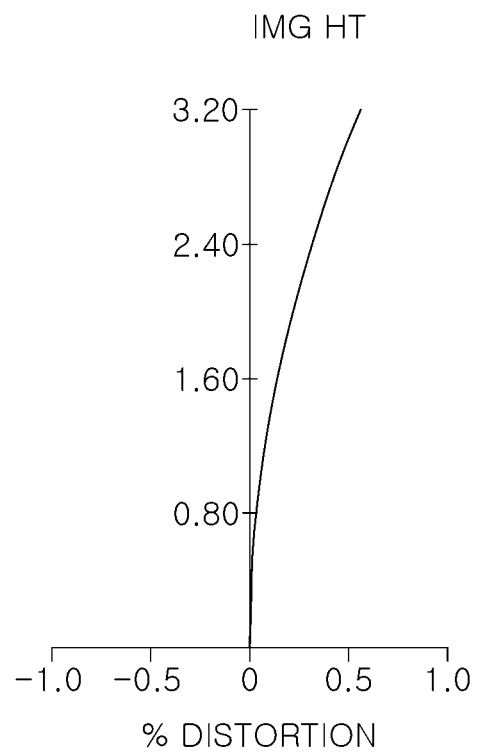

FIG. 15 is a view illustrating an eighth example of an optical imaging system, and FIG. 16 is a view illustrating aberration characteristics of the optical imaging system illustrated in FIG. 15.

Referring to FIG. 15, an optical system 800 may include an optical system including a first lens 810, a second lens 820, a third lens 830, and a fourth lens 840, and may further include a filter 860 and an image sensor 870.

In addition, the optical imaging system 800 may further include a reflecting member R disposed in front of the first lens 810 and having a reflecting surface that changes a path of light. The reflecting member R may be a prism, but alternatively may be a mirror.

Radii of curvature, thicknesses or distances refractive indices, Abbe numbers, effective radii, and focal lengths of the lenses and other elements are listed in Table 15 below. The thickness or distance is a thickness when it defines a distance between two surfaces of a lens or other element, and is a distance when it defines a distance between a surface of one lens or other element and a surface of a next lens or other element. The effective radius listed in Table 15 of a lens having a non-circular shape is a maximum effective radius of the lens having a non-circular shape. A minimum effective radius of the lens having a non-circular shape may be smaller than the maximum effective radius, and may be equal to or greater than 70% of the maximum effective radius.

An overall focal length f of the optical imaging system 800 may be 30.54 mm, an Fno thereof may be 5.37, an IMG HT thereof may be 3.202 mm, and an FOV thereof may be 11.90°.

The first lens 810 may have a positive refractive power, and a first surface and a second surface thereof may be convex.

The second lens 820 may have a negative refractive power, and a first surface and a second surface thereof may be concave.

The third lens 830 may have a positive refractive power, and a first surface and a second surface thereof may be convex.

The fourth lens 840 may have a negative refractive power, and a first surface thereof may be convex while a second surface thereof may be concave.

The surfaces of the first to fourth lenses 810 to 840 may have the aspherical constants listed in Table 16 below. For example, both the object-side surface and the image-side surface of each of the first to fourth lenses 810 to 840 may be aspherical.

TABLE 15

| Surface No. | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 6.000 | |
| S2 | | Infinity | 5.500 | 1.723 | 29.5 | 8.485 | |
| S3 | | Infinity | 3.000 | | | 6.000 | |
| S4 | First | 5.99 | 2.018 | 1.546 | 56.0 | 3.300 | 9.560 |
| S5 | Lens | −35.82 | 0.100 | | | 3.055 | |
| S6 | Second | −73.80 | 1.205 | 1.646 | 23.5 | 2.984 | −7.096 |
| S7 | Lens | 4.92 | 1.725 | | | 2.490 | |
| S8 | Third | 5.44 | 1.797 | 1.668 | 20.4 | 2.388 | 6.806 |
| S9 | Lens | −24.16 | 0.120 | | | 2.125 | |
| S10 | Fourth | 86.70 | 0.509 | 1.641 | 23.9 | 1.900 | −8.410 |
| S11 | Lens | 5.10 | 1.560 | | | 1.864 | |
| S12 | Filter | Infinity | 0.110 | 1.519 | 64.2 | 1.945 | |
| S13 | | Infinity | 18.668 | | | 1.950 | |
| S14 | Imaging Plane | Infinity | | | | 3.202 | |

TABLE 16

| Constant | S4 | S5 | S6 | S7 |
|---|---|---|---|---|
| K | −4.5851E−01 | −7.2969E+00 | 9.5275E+01 | 1.5026E−01 |
| A | 1.6197E−04 | 1.0675E−04 | −1.9204E−04 | −5.4117E−04 |
| B | −1.3302E−05 | 1.7175E−08 | 1.1886E−05 | −3.3702E−06 |
| C | 9.3018E−06 | 2.8333E−07 | 1.8576E−07 | −5.5843E−07 |
| D | −2.5759E−06 | 2.7246E−08 | 1.1572E−08 | 3.7729E−08 |
| E | 4.4664E−07 | 1.3522E−09 | 1.4384E−09 | 4.9881E−09 |
| F | −4.8902E−08 | 3.4755E−11 | 1.7096E−10 | 2.9567E−10 |
| G | 3.2784E−09 | −7.2615E−12 | 1.8615E−11 | −3.6637E−11 |
| H | −1.2214E−10 | −8.8110E−13 | 1.0129E−12 | −1.1475E−11 |
| J | 1.9039E−12 | 2.4131E−13 | −8.8327E−14 | −1.1920E−12 |

| Constant | S8 | S9 | S10 | S11 |
|---|---|---|---|---|
| K | 3.7259E−01 | −6.2261E+01 | −1.4428E−01 | 4.2961E−01 |
| A | −4.0155E−04 | 8.0371E−06 | 3.1219E−07 | −5.9891E−04 |
| B | 1.3906E−05 | 6.7874E−05 | 2.7201E−07 | 1.4246E−05 |
| C | −3.5388E−07 | −1.6802E−06 | −1.2504E−07 | −3.1392E−06 |
| D | −9.3184E−08 | −4.5978E−07 | −3.3656E−08 | −5.6450E−07 |
| E | −7.1301E−09 | 1.5795E−08 | −6.1921E−09 | −1.5658E−07 |
| F | −3.7241E−10 | 1.1918E−08 | −1.1300E−09 | −3.6195E−08 |
| G | 8.4723E−11 | −1.5972E−09 | −1.6761E−10 | 3.9954E−09 |
| H | 2.0133E−11 | 1.3615E−10 | −3.7593E−11 | 1.3527E−09 |
| J | 2.9317E−12 | −1.4094E−11 | −9.1302E−12 | 3.3116E−10 |

The optical imaging system 800 described above may have the aberration characteristics illustrated in FIG. 16.

Table 17 below lists various parameters of the first to eighth examples of the optical imaging system described above, and Table 18 below lists values of Conditional Expressions 1 to 13 described above based on the parameters in Table 17.

TABLE 17

| Parameter | Ex. 1 | Ex. 2 | Ex. 3 | Ex. 4 | Ex. 5 | Ex. 6 | Ex. 7 | Ex. 8 |
|---|---|---|---|---|---|---|---|---|
| f | 30.9 | 30.9 | 30.8999 | 30.9 | 30.9005 | 30.6 | 30.2572 | 30.54 |
| f1 | 12.886 | 11.117 | 11.586 | 10.596 | 10.316 | 10.112 | 9.974 | 9.560 |
| f2 | −19.749 | −13.009 | −14.174 | −12.028 | −8.914 | −7.875 | −7.690 | −7.096 |
| R1 | 8.74 | 7.02 | 7.32 | 7.09 | 6.96 | 5.83 | 5.87 | 5.99 |
| T1 | 1.548 | 1.800 | 1.800 | 1.700 | 1.723 | 1.993 | 1.974 | 2.018 |
| d12 | 0.213 | 0.093 | 0.096 | 0.030 | 0.035 | 0.035 | 0.100 | 0.100 |
| n2 | 1.615 | 1.641 | 1.641 | 1.641 | 1.646 | 1.646 | 1.646 | 1.646 |
| n3 | 1.671 | 1.679 | 1.689 | 1.689 | 1.668 | 1.668 | 1.668 | 1.668 |
| TTL | 28.200 | 27.155 | 27.200 | 26.995 | 27.495 | 26.998 | 27.252 | 27.812 |
| L1_Lf | 13.191 | 7.797 | 8.212 | 6.899 | 6.812 | 6.005 | 6.477 | 4.947 |
| BFL | 12.592 | 16.708 | 16.227 | 17.596 | 18.094 | 18.000 | 17.785 | 20.338 |
| IMG HT | 3.201 | 3.201 | 3.201 | 3.002 | 3.001 | 3.206 | 3.200 | 3.202 |
| Fno | 4.35 | 4.41 | 4.23 | 4.59 | 5.00 | 4.64 | 4.64 | 5.37 |
| FOV | 11.65° | 11.72° | 11.71° | 11.00° | 11.02° | 11.87° | 11.87° | 11.90° |
| L1S1el | 3.450 | 3.500 | 3.650 | 3.360 | 3.157 | 3.300 | 3.300 | 3.300 |
| L3S1el | 1.958 | 2.588 | 2.605 | 2.603 | 2.585 | 2.659 | 2.621 | 2.388 |
| LfS2el | 1.736 | 2.001 | 2.025 | 2.022 | 1.892 | 1.940 | 1.940 | 1.864 |

TABLE 18

| Conditional Expression | Ex. 1 | Ex. 2 | Ex. 3 | Ex. 4 | Ex. 5 | Ex. 6 | Ex. 7 | Ex. 8 |
|---|---|---|---|---|---|---|---|---|
| n2 + n3 | 3.286 | 3.320 | 3.330 | 3.330 | 3.314 | 3.314 | 3.314 | 3.314 |
| \|f/f1 + f/f2\| | 0.833 | 0.404 | 0.487 | 0.347 | 0.471 | 0.860 | 0.901 | 1.109 |
| d12/f | 0.0069 | 0.0030 | 0.0031 | 0.0010 | 0.0010 | 0.0011 | 0.0033 | 0.0033 |
| L3S1el/L1S1el | 0.568 | 0.739 | 0.714 | 0.775 | 0.819 | 0.806 | 0.794 | 0.724 |
| LfS2el/L1S1el | 0.503 | 0.572 | 0.555 | 0.602 | 0.599 | 0.588 | 0.588 | 0.565 |
| R1/f | 0.283 | 0.227 | 0.237 | 0.229 | 0.225 | 0.191 | 0.194 | 0.196 |
| L1_Lf | 13.191 | 7.797 | 8.212 | 6.899 | 6.812 | 6.005 | 6.477 | 4.947 |
| TTL/f | 0.913 | 0.879 | 0.880 | 0.874 | 0.890 | 0.882 | 0.901 | 0.911 |
| T1/TTL | 0.055 | 0.066 | 0.066 | 0.063 | 0.063 | 0.074 | 0.072 | 0.073 |
| FOV | 11.65° | 11.72° | 11.71° | 11.00° | 11.02° | 11.87° | 11.87° | 11.90° |
| TTL/(2*IMG HT) | 4.405 | 4.242 | 4.249 | 4.496 | 4.581 | 4.211 | 4.258 | 4.343 |

TABLE 18-continued

| Conditional Expression | Ex. 1 | Ex. 2 | Ex. 3 | Ex. 4 | Ex. 5 | Ex. 6 | Ex. 7 | Ex. 8 |
|---|---|---|---|---|---|---|---|---|
| BFL/f | 0.408 | 0.541 | 0.525 | 0.569 | 0.586 | 0.588 | 0.588 | 0.666 |
| Fno | 4.35 | 4.41 | 4.23 | 4.59 | 5.00 | 4.64 | 4.64 | 5.37 |

The examples of the optical imaging system may be mounted in a mobile electronic device having a small thickness and have a long focal length.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, and a fifth lens sequentially disposed in ascending numerical order along an optical axis of the optical imaging system from an object side of the optical imaging system toward an imaging plane of the optical imaging system,
wherein the first lens has a positive refractive power and a convex image-side surface in a paraxial region,
wherein the second lens has a negative refractive power,
wherein the third lens has a positive refractive power,
wherein the fourth lens has a negative refractive power, and
wherein LfS2el/L1S1el≤0.65 and 0.05<T1/TTL<0.1 are satisfied, where LfS2el is a maximum effective radius of an image-side surface of the fifth lens, L1S1el is a maximum effective radius of an object-side surface of the first lens, T1 is a thickness of the first lens along the optical axis, and TTL is a distance along the optical axis from the object-side surface of the first lens to the imaging plane, and
wherein 0.8≤TTL/f≤0.95 is satisfied, where f is an overall focal length of the optical imaging system.

2. The optical imaging system of claim 1, wherein L3S1el/L1S1el≤0.85 is satisfied, where L3S1el is a maximum effective radius of an object-side surface of the third lens.

3. The optical imaging system of claim 1, wherein L1_Lf>4.9 mm is satisfied, where L1_Lf is a distance along the optical axis from an image-side surface of the first lens to an object-side surface of the fifth lens.

4. The optical imaging system of claim 1, wherein n2+n3>3.2 is satisfied, where n2 is a refractive index of the second lens, and n3 is a refractive index of the third lens.

5. The optical imaging system of claim 1, wherein |f/f1+f/f2|<1.2 is satisfied, where f1 is a focal length of the first lens, and f2 is a focal length of the second lens.

6. The optical imaging system of claim 1, wherein 0≤d12/f≤0.05 is satisfied, where d12 is a distance along the optical axis from an image-side surface of the first lens to an object-side surface of the second lens.

7. The optical imaging system of claim 1, wherein R1/f≤0.3 is satisfied, where R1 is a radius of curvature of the object-side surface of the first lens.

8. The optical imaging system of claim 1, wherein FOV<12° is satisfied, where FOV is a field of view of the optical imaging system.

9. The optical imaging system of claim 1, wherein 4<TTL/(2*IMG HT)<4.9 is satisfied, where IMG HT is one half of a diagonal length of the imaging plane.

10. The optical imaging system of claim 1, wherein Fno≥4.0 is satisfied, where Fno is an F-number of the optical imaging system.

11. The optical imaging system of claim 1, wherein the fifth lens has a positive refractive power.

12. The optical imaging system of claim 1, further comprising a reflecting member disposed in front of the first lens,
wherein the reflecting member comprises a reflecting surface configured to reflect light incident on the reflecting surface toward the first lens.

13. An optical imaging system comprising:
a first lens, a second lens, a third lens, and a fourth lens sequentially disposed in ascending numerical order along an optical axis of the optical imaging system from an object side of the optical imaging system toward an imaging plane of the optical imaging system,
wherein the first lens has a positive refractive power and a convex image-side surface in a paraxial region,
wherein the second lens has a negative refractive power,
wherein the third lens has a positive refractive power,
wherein the fourth lens has a negative refractive power,
wherein L3S1el/L1S1el≤0.85 and 0.05<T1/TTL<0.1 are satisfied, where L3S1el is a maximum effective radius of an object-side surface of the third lens, L1S1el is a maximum effective radius of an object-side surface of the first lens, T1 is a thickness of the first lens along the optical axis, and TTL is a distance along the optical axis from the object-side surface of the first lens to the imaging plane, and
wherein 0.8≤TTL/f≤0.95 is satisfied, where f is an overall focal length of the optical imaging system.

14. The optical imaging system of claim 13, wherein LfS2el/L1S1el≤0.65 is satisfied, where LfS2el is a maximum effective radius of an image-side surface of the fourth lens.

15. An optical imaging system comprising:
a plurality of lenses sequentially disposed along an optical axis of the optical imaging system from an object side of the optical imaging system toward an imaging plane of the optical imaging system, wherein the plurality of lenses comprise:
- a first lens which has a positive refractive power and a convex image-side surface,
- a second lens which has a negative refractive power,
- a third lens which has a positive refractive power, and
- a fourth lens which has a negative refractive power, wherein LfS2el/L1S1el≤0.65 and 0.05<T1/TTL<0.1 are satisfied, where LfS2el is a maximum effective radius of an image-side surface of a last lens that is closest to the imaging plane among the plurality of lenses, L1S1el is a maximum effective radius of an object-side surface of a first lens that is closest to the object side of the optical imaging system among the plurality of lenses, T1 is a thickness of the first lens along the optical axis, and TTL is a distance along the optical axis from the object-side surface of the first lens to the imaging plane, and wherein 0.8≤TTL/f≤0.95 is satisfied, where f is an overall focal length of the optical imaging system.

16. The optical imaging system of claim 15, wherein L3S1el/L1S1el≤0.85 is satisfied, where L3S1el is a maximum effective radius of an object-side surface of a third lens that is third closest to the object side of the optical imaging system among the plurality of lenses.

17. The optical imaging system of claim 15, wherein 0.4<BFL/f<0.7 is satisfied, where BFL is a distance along the optical axis from the image-side surface of the last lens to the imaging plane.

18. The optical imaging system of claim 15, wherein each pair of adjacent lenses among the plurality of lenses have refractive powers having opposite signs.

* * * * *